United States Patent Office 3,206,472
Patented Sept. 14, 1965

3,206,472
2,8,10a,12a, SUBSTITUTED CHRYSENES
Wataru Nagata, Hyogo Prefecture, Japan, assignor to Shionogi & Co., Ltd., Osaka, Japan
No Drawing. Filed July 27, 1961, Ser. No. 127,097
Claims priority, application Japan, Mar. 12, 1960, 35/8,208; Mar. 19, 1960, 35/9,421; Apr. 4, 1960, 35/20,124, 35/20,125; Apr. 6, 1960, 35/20,723; Apr. 21, 1960, 35/22,417; Apr. 25, 1960, 35/22,611
10 Claims. (Cl. 260—326.3)

This application is a continuation-in-part of copending applications Serial Nos. 93,869, 94,988, 98,334, and 103,741, respectively, filed on March 7, 1961, March 13, 1961, March 27, 1961, and April 14, 1961 (all now abandoned).

This invention relates to compositions of matter, particularly organic compounds and their methods of preparation, and more especially to intermediates useful in the total synthesis of steroids and to the preparation of such intermediates. More particularly, the present invention also relates to novel total synthetic methods of preparing steroids and intermediates therefor, including steps in which the reactions are originally novel.

Specifically, in a first aspect thereof, this invention relates to a novel total synthesis of the steroids represented by the formula:

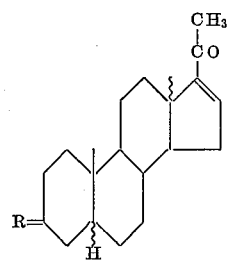

wherein R represents

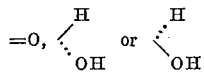

and the ripple mark (⌇) is a generic indication of both the α- and β-configurations, and intermediates thereof.

In a second aspect thereof, this invention relates to an original novel process for the introduction of a methyl radical into an angular position, such process being generally applicable in the organic chemistry field, and especially in the synthetic production of steroidal compounds.

In a third aspect thereof, this invention relates to an original novel process for the introduction of a cyano radical into an angular position, such process being again generally applicable in the organic chemistry field, and especially in the synthetic production of steroidal compounds.

In a fourth aspect thereof, this invention relates to an original novel process for the fission of the C-N bond in an angular carbamoyl radical, this process being also generally applicable in the organic chemistry field, and especially in the synthetic production of steroidal compounds.

Accordingly, a basic object of the present invention is to provide a novel total synthetic method for the production of steroids and intermediates therefor, with further other objects corresponding to the aforesaid aspects, respectively.

These and other objects and the manner in which they are accomplished will become apparent to those conversant with the art from the following description of the general class of compounds and the several specific examples and methods of obtaining them presented.

The position-numbering employed herein for the steroidal type compounds is that generally accepted in steroid chemistry, i.e.,

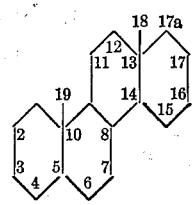

and

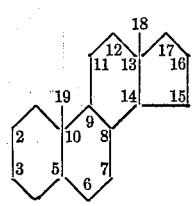

unless some other numbering is specially mentioned.

The synthesis is generically outlined in the following reaction scheme:

Part I

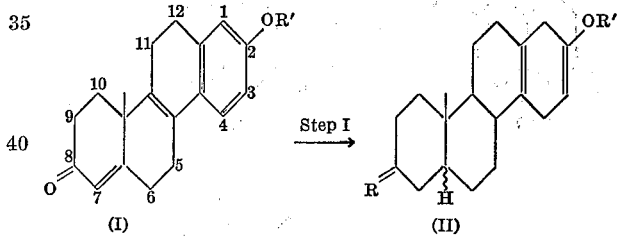

Part II

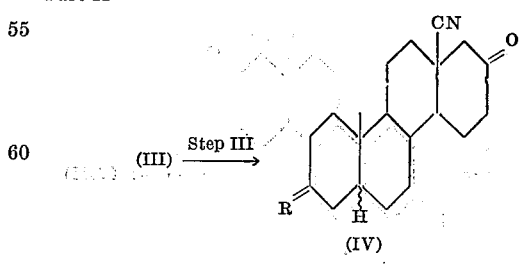

Part III

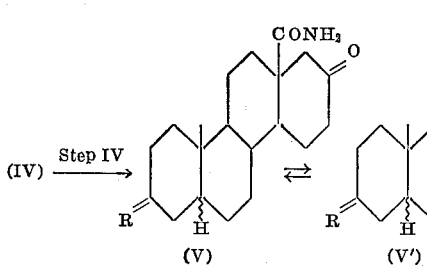

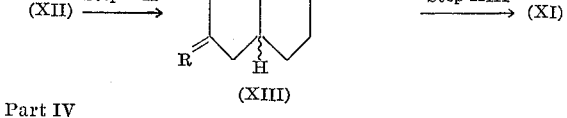

Part IV

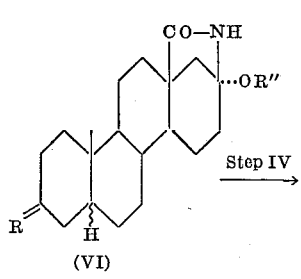

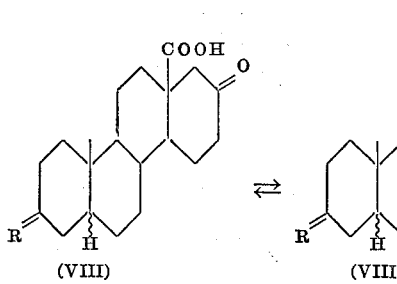

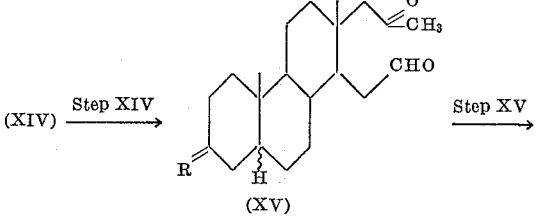

Part V

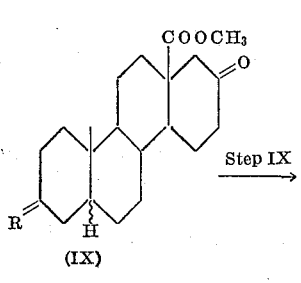

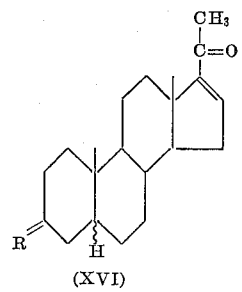

Part III'

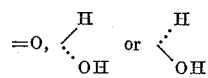

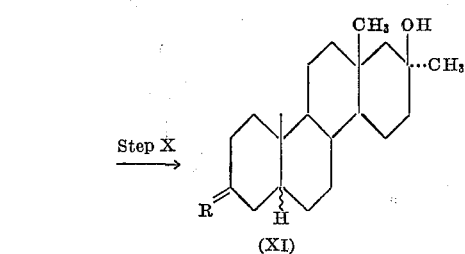

In the foregoing reaction scheme, R represents $$=O, \begin{array}{c}H\\ \cdots OH\end{array} \text{ or } \begin{array}{c}H\\ \cdots OH\end{array}$$

R' represents a lower alkyl radical containing from 1 to 3 carbon atoms such as methyl, ethyl, propyl, etc., R'' represents a lower alkyl or alkanoyl containing from 1 to 4 carbon atoms such as methyl, ethyl, propyl, butyl, acetyl, propionyl, butyryl, etc., R''' represents a lower alkyl-sulfonyl, aryl-sulfonyl or aralkyl-sulfonyl radical such as methylsulfonyl, ethylsulfonyl, propylsulfonyl, benzenesulfonyl, toluenesulfonyl, xylenesulfonyl, benzylsulfonyl, phenylethylsulfonyl, etc., and the ripple mark (ξ) represents either α- or β-configuration. In this connection, it should be understood that the reaction scheme shows the substantial order of the steps in the total synthesis, modifications and equivalents—including possible detours—being omitted. Thus, any hydroxyl and/or oxo radicals in the disclosed compounds are intended also to represent such radicals properly protected, when necessary, although—for the sake of simplicity—such radicals are shown only in unprotected form in the reaction scheme. In other words, the showing of an hydroxyl radical is intended to represent a free hydroxyl or a protected hydroxyl such as acylated hydroxyl, and the showing of an oxo radical is intended to represent a free oxo or a protected oxo such as ketalized oxo.

When necessary, the protection of a hydroxyl radical or an oxo radical may be effected by ordinary methods known to those skilled in the art. When the said free radicals (—OH or =O) are undesirably affected by any reagent in any step in the course of the synthesis, it is necessary to protect them in advance of executing the step. A hydroxyl radical is usually protected by acylation, which can be carried out by treating the hydroxyl compound with an acylating agent in the presence of a condensing agent. For instance, the hydroxyl compound may be converted into the corresponding acetoxy compound by treating with acetic anhydride in the presence of pyridine or p-toluenesulfonic acid. Subsequent deacylation, if desired, can be easily carried out by treatment of the acyloxy compound with alkali, usually while heating. The generally employed method for protecting an oxo radical is ketalation, which can be realized by the treatment of an oxo compound with an alcohol in the presence of a condensing agent. For instance, the ketalation may be carried out by heating the oxo compound with ethanol or ethyleneglycol in the presence of p-toluenesulfonic acid in an organic medium such as benzene or toluene. Subsequent deketalation, if desired, can be easily carried out by heating the ketalized compound with acid.

The starting material of the present invention is 2-alkoxy-10a-methyl - 5,6,8,9,10,10a,11,12 - octahydrochrysen-8-one (Formula I) which is described and claimed in the copending application of W. Nagata and S. Hirai, Serial No. 837,328, filed September 1, 1959, now abandoned. A compound of Formula I can be prepared by reacting 6-alkoxy-2-tetralone (Formula A) with vinyl ethyl ketone or equivalent thereof in the presence of a condensing agent such as alkali metal, alkali metal hydride, alkali metal alcoholate, alkali metal amide, amine or organic ammonium hydroxide and reacting the resulting tautomer of 1-methyl-7-alkoxy-1,2,3,4,9,10 - hexahydrophenanthren-2-one and 1-methyl-7-alkoxy-2,3,4,4a,9,10-hexahydrophenanthren-2-one (Formula B) with vinyl methyl ketone or equivalent thereof in the presence of such a condensing agent. In the latter reaction, when carried out under a relatively mild condition, 1,6-dimethyl-6-hydroxy-9-oxo-2,3-(2'-alkoxy-7',8'-dihydro-6',5'-naphtho) - $\Delta^2$ - bicyclo-[3.3.1]nonene (Formula C) is obtained as a reaction product, but this is easily transformed to the compound I by heating in the presence of a condensing agent, as aforesaid. The said steps can be represented by the following scheme:

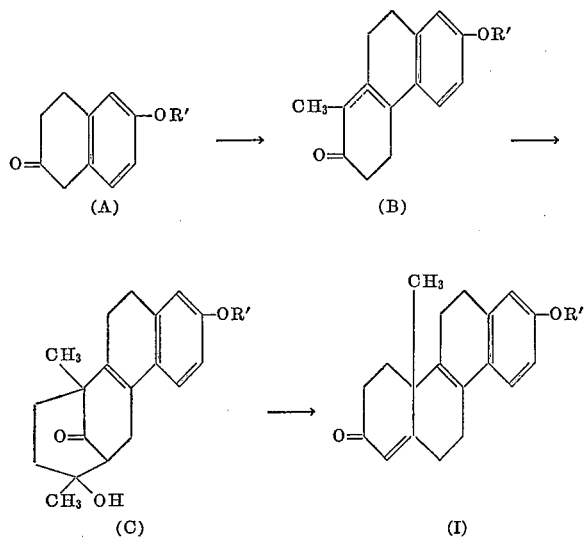

wherein R' represents a lower alkyl radical containing from 1 to 3 carbon atoms such as methyl, ethyl, propyl, etc. For instance, 2-methoxy-10a-methyl-5,6,8,9,10,10a,11,12-octahydrochrysen-8-one (Formula I, R'=CH₃) is prepared by refluxing mildly 6-methoxy-2-tetralone (Formula A, R'=CH₃) with an equimolar quantity of β-diethyl-yl-aminoethyl ethyl ketone in anhydrous ether in the presence of sodium hydride and reacting the resulting mixture containing a tautomer of 1-methyl-7-methoxy-1,2,3,4,9,10-hexahydrophenanthren-2-one (Formula B, R'=CH₃) with an equimolar quantity of β-diethylaminoethyl methyl ketone at about 0 to 5° C., followed by refluxing. The production of the other starting compounds (Formula I, R'=C₂H₅ or C₃H₇) is carried out in analogus manner. However, the disclosure relating the production of the starting materials (I) stated above should not be understood to be my sole invention.

The synthesis according to this invention consists of five parts; the first part is concerned with the reduction of the double bonds in the initial chrysene nucleus; the second part is concerned with the cyanation at the 13-position; the third part is concerned with the conversion of the introduced cyano radical to the methyl radical, accompanied by the introduction of a hydroxyl radical and a methyl radical into the 17-position in preparation for the next following step; the fourth part is concerned with dehydration in the 6-membered ring D; and the fifth part is concerned with degradation of the 6-membered ring D to the five-membered ring D.

The first part comprises the step relating to the reduction of compound I, with or without previous partial reduction, to the enol ether compound (Formula II) (step I) and the step of hydrolysis of compound II accompanied by rearrangement to the unsaturated keto compound (Formula III) (step II).

In step I, the reaction may be carried out by treating compound I, with or without previous partial reduction, with an alkali metal or an alkaline earth metal such as lithium, sodium, potassium or calcium dissolved in liquid ammonia or a homolog thereof, namely an organic amine such as trimethylamine or triethylamine, in the presence of a water-containing or water-free lower alkanol such as methanol, ethanol, 2-methoxyethanol or 2-ethoxyethanol, with or without another organic solvent such as ether, tetrahydrofuran or dioxane, at a temperature lower than room temperature (about 15 to 30° C.).

In step II, the reaction may be carried out by treating compound II with an acid such as hydrochloric acid, sulfuric acid or acetic acid, usually in an organic solvent, with refluxing. Although compound II can be intermediarily isolated, it is preferable to carry out steps I and II successively without its isolation from the viewpoint of economy in the synthesis.

The product of this part of the invention can be generically represented by Formula III. When compound I, 2-alkoxy-10a-methyl-5,6,8,9,10,10a,11,12 - octahydrochrysen-8-one itself, is used as starting compound of this part, i.e. without previous partial reduction, 3β-hydroxy-D-homo-18-nor-5α-androst-13(17a)-en-17-one is obtained. When 2-alkoxy-10a-methyl-5,6,8,9,10,10a,11,12 - octahydrochrysen-8-one is catalytically reduced by treatment with hydrogen in the presence of platinum or palladium catalyst and then the resulting 2-alkoxy-10a-methyl-5,6,6aβ,7,8,9,10,10a,11,12-decahydrochrysen-8-one is subjected to the reactions of steps I and II, 3α-hydroxy-D-homo-18-nor-5β-androst-13(17a)-en-17-one is obtained as product. The same product can be obtained from 2-alkoxy-8α-hydroxy-10a-methyl - 5,6,6aβ,7,8,9,10,10a,11,12 - decahydrochrysene, prepared by reducing 2-alkoxy-10a-methyl-5,6,6aβ,7,8,9,10,10a,11,12 - decahydrochrysen - 8 - one with lithium aluminum hydride, according to the method in steps I and II. Similarly, 2-alkoxy-10a-methyl-5,6,6aβ,7,8,9,10,10a,11,12-decahydrochrysen-8-one 8-ethylene ketal, which is obtained by the ketalation of 2-alkoxy-10a-methyl - 5,6,6aβ,7,8,9,10,10a,11,12 - decahydrochrysen-8-one can be converted into D-homo-18-nor-5β-androst-13 (17a)-en-3,17-dione 3-ethylene ketal and the latter can be easily deketalated to the corresponding free keto compound. These and other associated conversions are shown in the following schemes:

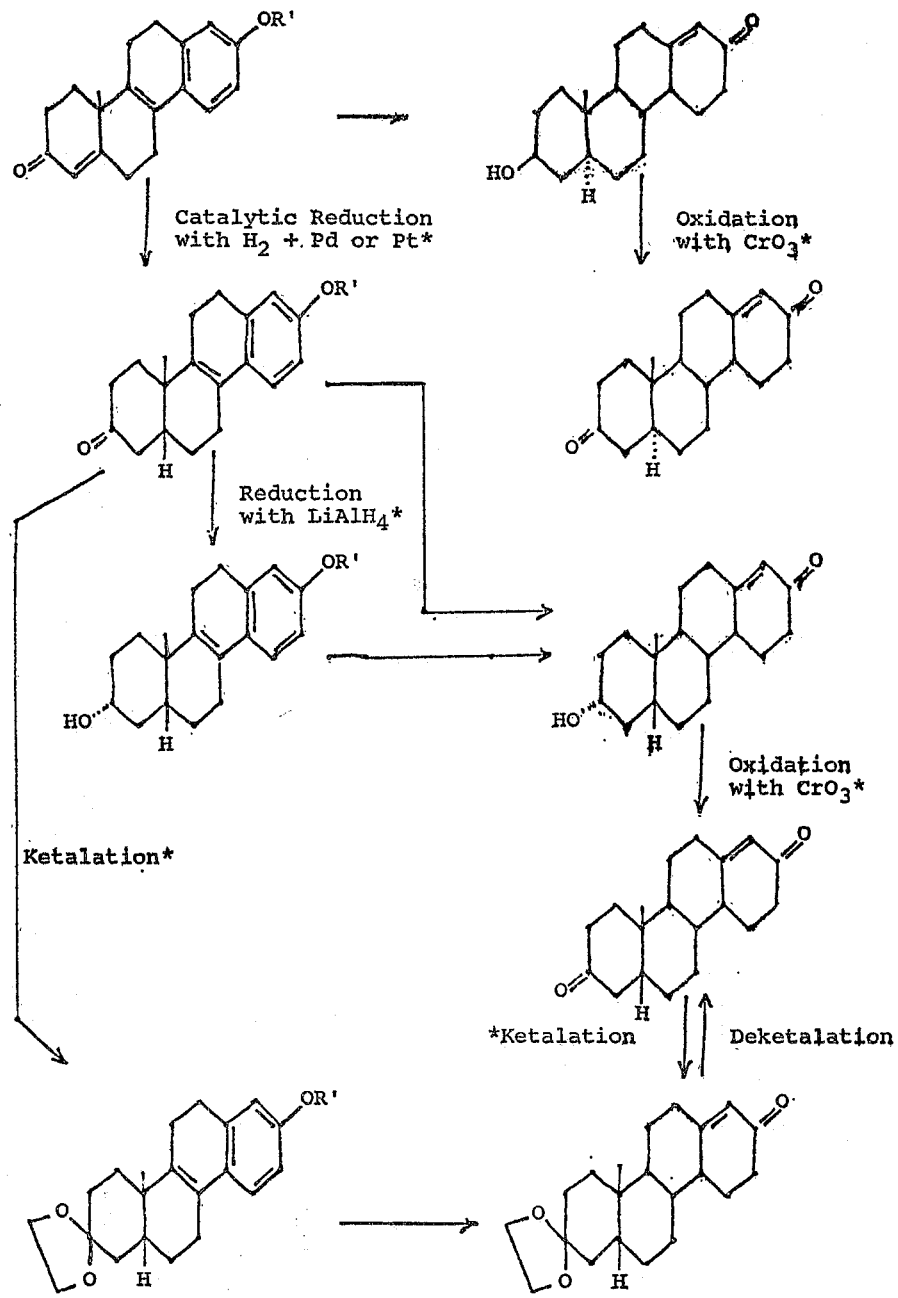

* (These steps are carried out in per se conventional manner).

The subsequent steps, with or without protection of the hydroxyl radical or the oxo radical, can be carried out in precisely the same manner with each of the compounds obtained according to the preceding reaction schemes.

When compound I is subjected to the reactions in steps I and II, after protection of the 8-oxo radical by ketalation or reduction of the 8-oxo radical to the 8-hydroxyl radical by treatment with lithium and aluminum hydride, the double bond in the ring A remains in the resultant product, without being reduced.

Relating to this part of the synthesis, it should be noted that the compound having the most thermodynamically stable steric configuration, i.e. the same steric configuration as in the natural steroids, is obtained as a main product. Although the 8,14-isomer (B:C-trans) is sometimes by-produced in the reaction, it can be readily separated by recrystallization, chromatography or a combination thereof.

The second part of the present invention comprises the step relating to the cyanation of compound III at the 13-position to form the angular cyano compound (Formula IV) (step III), with or without accompanying hydrolysis of compound IV to the angular acid amide (Formula V or V').

In step III, the reaction may be carried out by treating compound III with a cyanating agent. Alkali metal cyanide, alkaline earth metal cyanide, hydrocyanic acid complex or a combination of hydrocyanic acid and base, especially a base acting as a Lewis acid, can be used as cyanating agent. Illustrative of a hydrocyanic acid complex is lithium aluminum cyanide or cyano magnesium halide or the like. Suitable bases for combination with hydrocyanic acid include, for example, trimethylamine, triethylamine, $Al(X)_3$ or $Al(X)(X')_2$, wherein X and X' each represent lower alkyl or alkoxy radicals such as methyl, ethyl, propyl, butyl, iso-butyl, tert-butyl, methoxy, ethoxy, propoxy, iso-propoxy, butoxy, iso-butoxy or tert-butoxy. The reaction is usually carried out in a suitable inert solvent such as a lower alkanol, dioxane, dimethylformamide, ether, tetrahydrofuran, benzene or toluene at about 20 to 100° C. for 2 to 12 hours. Although the reaction is essentially cyanation, the hydrolysis of compound IV may simultaneously occur, depending upon reaction conditions, to afford the acid amide. The latter is a tautomer of γ-keto-acid amide (Formula V) and γ-lactam-ol (Formula V'). However, in solid phase, it can be proved by measurement of IR-spectrum that the lactam form is predominant. The tendency toward occurrence of the hydrolysis is enhanced by the use of a strongly basic agent such as alkali metal cyanide or by the presence of water in the reaction mixture. To avoid the hydrolysis by moderation of basicity, as well as to promote the cyanation reaction, ammonium halide, acetic acid, ammonium acetate, alkali bisulfite or the like may adavntageously be used as catalyst, especially when strongly basic agents are employed. Moreover, the hydrolysis is entirely avoidable, when a combination agent of hydrocyanic acid and base acting as a Lewis acid is used.

The reaction product of this part of the invention is a mixture of compound IV and steric isomer thereof (Formula D) and/or the compound V or V' and steric isomer thereof (Formula E or E').

(D)

(E)    (E')

The mixture can be separated into each compound or steric isomer by chromatography or recrystallization. Alternatively, the separation may be carried out in a suitable subsequent stage, if difficulty is encountered at the present stage. Although the description of the subsequent steps is made with reference to 13β compounds, the corresponding 13α compounds can be obtained from the compounds D and E or E' by the application of the same reactions in such steps.

In this connection, it should be noted that the reaction in the step III is originally novel and is generally applicable for the cyanation of the angular position. In other words, the reaction can generally apply to compounds having a conjugated enone structure or equivalent thereof, of which the β-position corresponds to an angular position of a polyhydroisocyclic compound. Such compounds may be exemplified as follows:

2,3,4,4a,5,6,7,8-octahydronaphthalen-2-one,
7-hydroxy-2,3,4,4aα,4bβ,5,6,7,8,8aα,9,10-dodecahydrophenanthren-2-one,
2,7-dihydroxy-1,2,3,4,4aα,4bβ,5,6,7,8,8aα,9-dodecahydrophenanthren-9-one,
3-hydroxy-D-homo-18-nor-androst-13(17a)-en-17-one,
D-homo-18-nor-androst-13(17a)-en-3,17-dione,
3-hydroxy-D-homo-18-nor-androsta 9(11),13(17a)-dien-17-one,
3,9α-dihydroxy-D-homo-18-nor-androst-13(17a)-en-17-one,
3,9α-dihydroxy-D-homo-18-nor-androsta-5,13(17a)-dien-17-one,
3-hydroxy-D-homo-18-nor-androsta-5,9(11),13(17a)-trien-17-one,
3,17-dihydroxy-D-homo-8-nor-androst-12-en-11-one,
3,16-dihydroxy-18-nor-androst-12-en-11-one,
3-hydroxy-18-nor-pregna-1,3,5(10),13(17)-tetraen-20-one and
3-hydroxy-13-acetoxy-8-nor-pregna-1,3,5(10)-trien-20-one In these compounds, the unspecified position of the mentioned substituents, may be in α- or β-configuration. Although the last compound set forth above does not have the structure of a conjugated enone, it is an addition product of acetic acid with 3-hydroxy-18-nor-pregna-1,3,5 (10),13(17)-tetraen-20-one and the acetoxy radical is as active as conjugated enone. In the reaction, a cyano radical is introduced so as to form an axial bond for the ring having the enone structure. Therefore, when the enone is involved in an outside ring such as the ring A or the ring D of a steroid, the reaction yields a mixture of cis-cyano and trans-cyano compounds, of which each cyano radical is axial to the outside ring. On the contrary, when the enone is involved in an intermediate ring such as the ring B or the ring C of a steroid, only one steric isomer results so as to cause trans-junctre. Accordingly, for example, when the reaction is applied to the 11-oxo-18-nor-Δ$^{12}$-steroids, a cyano radical is introduced stereospecifically into the 13β-position. This is extremely advantageous for the synthesis of 11-oxidized steroids such as prednisolone, prednisone, dexamethasone or hydrocortisone.

The third part of the invention comprises the step relating to the hydrolysis of compound IV to the angular acid amide (V or V') (step IV); the steps for the cleavage of the C-N bond of the angular carbamoyl radical in compound V consisting of (i) the step relating to the alkylation of compound V to the ether or the ester (Formula VI) (step V), followed with or without (ii) the succeeding step relating to the sulfonylation of compound VI to the N-sulfonylated compound (Formula VII) (step VI), and (iii) the step relating to the hydrolysis of the compound VII to the angular carboxylic acid (Formula VIII or VIII') (step VII); the step relating to the methylation of compound VIII to the methyl ester (Formula IX) (step VIII); the step relating to the lactonization of compound IX to the lactone (Formula X) (step IX); and the step relating to the reductive fission of the lactone bond in compound X to the angular methyl compound (Formula XI) (step X).

In step IV, the reaction may be carried out by treating the compound IV with alkali in a suitable solvent. Usually, it is executed by heating compound IV with alkali metal hydroxide such as sodium hydroxide or potassium hydroxide in methanol-water. As stated above, this step can be carried out simultaneously with step III according to the reaction condition.

In connection with the thus-obtained compound V or V', it should be noted that, according to general knowledge, an angular amide should be hydrolyzable by conventional alkali treatment. This procedure can not be successfully carried out with compounds V or V'. This is ascribable to steric hindrance and electronic condition. However, this difficulty is overcome by the present invention. Thus, when the hydroxyl radical of compound V or V' is etherized (this is a ketalation in a sense) and the compound thus fixed in the structure of compound V, the ether group acts on the carbonyl radical at the β-position as "driving force" for the addition of reagents acting on the carbonyl radical and for the subsequent fission of the C-N bond. This may be one of 1,4-elimination under fragmentation. Hydrolysis of such angular carbamoyl radical in a fused cyclic compound is carried out for the first time by the invention. In this connection, while a similar effect may be expected from the introduction of a negative atom or radical such as halogen or an ester group instead of an ether group, this is practically unsuitable. Further improvement is, moreover, accomplished by the invention. The fission of the C-N bond is accelerated by substitution of the hydrogen atom attached to the nitrogen atom in the bond with a radical such as an alkyl-sulfonyl, aryl-sulfonyl or aralkyl-sulfonyl radical, because such substituents hinder the proton-donation of the nitrogen atom to the carbonyl radical by their inductive effect. Consequently, splitting of the C-N bond is facilitated, and therefore hydrolysis can proceed under milder conditions and with a higher yield (substantially quantitatively). The partial reaction scheme may be represented as follows:

tioned above. However, compound VIII is easily esterified and fixed in a keto carboxylic type.

In step VIII, the reaction may be carried out by treating compound VIII with diazomethane in an inert organic solvent such as dioxane, ether, benzene or toluene to afford compound IX.

Compound IX may be prepared directly from compound VII by solvolysis with alcoholic alkali or alkali alkoxide.

In step IX, the reaction may be carried out by treating compound IX with a Grignard reagent such as methylmagnesium iodide in an inert organic solvent such as tetrahydrofuran or ether at about room temperature.

In step X, the reaction may be carried out by treating compound X with a metal hydride such as lithium aluminum hydride, sodium aluminum hydride, magnesium aluminum hydride, aluminum hydride or lithium aluminum alkoxyhydride in an inert organic solvent such as ether

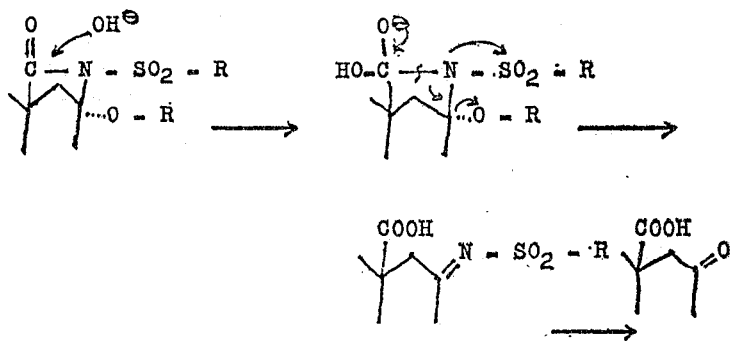

The reactions in steps V to VII are based upon the said discovery.

In step V, an etherification reaction may be carried out by treating compound V or V' with an alcohol such as methanol, ethanol or propanol in the presence of an acid such as hydrochloric acid, sulfuric acid or p-toluenesulfonic acid with or without azeotropic procedure. Also, an esterification reaction may be carried out by treating compound V or V' with an acid chloride or an acid anhydride in the presence of an alkaline condensing agent.

In step VI, the reaction may be carried out by treating compound VI obtained in the preceding step with an alkyl-sulfonyl, aryl-sulfonyl or aralkyl-sulfonyl halide such as methylsulfonyl, ethylsulfonyl, propylsulfonyl, benzenesulfonyl, toluenesulfonyl, xylenesulfonyl, benzylsulfonyl or phenylethylsulfonyl halide in the presence of a catalyst in a non-polar solvent such as benzene, toluene or xylene. As catalysts, the reagents which have ability to substitute active hydrogen for metal can be employed, for example alkali metals, alkali metal hydrides and alkali metal amides.

It is clear from the foregoing description that step V relating to etherification or esterifictaion of the hydroxyl radical is essential to perform the hydrolysis of the angular amide having a rigid neopentyl carbon-arrangement, but step VI relating to the sulfonylation of the amino radical is not always necessary. However, in general, the hydrolysis of the angular amide according to subsequent step VIII, without the previous sulfonylation of step VI, can proceed only with a side reaction under highly drastic conditions to afford the product in a lower yield. Accordingly, it is preferred to go through the sulfonylation step VI.

In step VII, the reaction can be carried out by treating compound VII with alkali such as sodium hydroxide or potassium hydroxide in a suitable solvent such as methanol, ethanol, ethyleneglycol or dioxane while heating to afford quantitatively the compound VIII or VIII'.

Thus obtained angular carboxylic acid VIII tends to form a hemiketal lactone structure VIII' with a β-oxo radical similar to the angular amide compound V menor tetrahydrofuran at about room temperature or higher, and converting the resultant reduction product to the semicarbazone, hydrazone or azine thereof, followed by decomposition of the latter by heating in the presence of an alkaline catalyst such as sodium, sodium methoxide, sodium ethoxide, sodium hydroxide or potassium hydroxide, in the presence or absence of an inert organic solvent such as methanol, ethanol, diethyleneglycol or triethyleneglycol.

The third part of the invention may be modified in part. Thus, compound IV can be converted through the angular aldehyde (Formula XII) into compound VIII. This procedure consists of the step of reduction of compound IV, followed by the hydrolysis to compound XII (step IV'), and of the step of oxidation of compound XII to compound VIII (step XII).

In step IV', the reaction can be carried out by treating compound IV with a metal hydride such as lithium aluminum hydride, sodium aluminum hydride, magnesium aluminum hydride, aluminum hydride or lithium aluminum alkoxyhydride in an inert organic solvent such as tetrahydrofuran or ether at about room temperature or higher, and then treating the resultant reduction product with alkali or subjecting the same to alumina chromatography. Prior to the application of this step to compound IV, the oxo radical in the compound should be changed into the ketal for protection from reduction.

In step XII, the reaction may be carried out by treating compound XII with an oxidizing agent such as chromic acid, permanganate, silver oxide, hydrogen peroxide or organic peracid. Especially, a mixture of chromic acid and inorganic acid such as sulfuric acid in inert organic solvent such as acetone can be suitably used as oxidizing agent in this step. If necessary, the oxidation may be carried out under the protection of the other oxidizable substituents in conventional manner.

Alternatively, the conversion of compound XII to compound XI can be effected through the angular methyl compound (Formula XIII). This procedure consists of the step of reductive methylation of compound XII to compound XIII (step XII') and the step of 17-methylation of compound XIII to compound XI (step XIII).

In step XII′, the reaction may be carried out by changing compound XII to the semicarbazone, hydrazone or azine thereof and decomposing the latter with heating in the presence of an alkaline catalyst such as sodium, sodium methoxide, sodium ethoxide, sodium hydroxide or potassium hydroxide, in the presence or absence of an insert organic solvent such as methanol, ethanol, diethyleneglycol or triethyleneglycol.

In step XIII, the reaction may be carried out by treating compound XI with a Grignard reagent such as methyl magnesium iodide in an inert organic solvent such as ether, tetrahydrofuran or benzene.

The said third part including partial modifications are generally applicable in the steroid field, and compounds having a cyano radical at the angular position can be converted into the corresponding angular methyl compounds according to the steps in this part of the present invention.

As the product in this part of the invention, there is obtained the 13β-methyl compound XI from the 13β-cyano compound IV, while the 13α-methyl compound (Formula F)

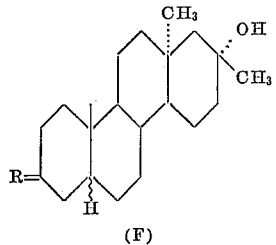

(F)

is obtained from the 13α-cyano compound D.

The fourth part of the present invention comprises the step relating to the dehydration of compound XI to the Δ¹⁷-methyl compound (Formula XIV) (step XI).

In step XI, the reaction may be carried out by treating the compound XI with dehydrating agents such as pyridine and phosphorus chloride. As the result of the reaction, there is obtained the compound XIV as a tautometric mixture.

The fifth part of the invention comprises the step relating to the oxidative fission of the 6-membered ring D in compound XIV to form the keto aldehyde (Formula XV) (step XIV) and the step relating to the dehydrative ring closure of compound XV to the final product (Formula XVI) (step XV).

In step XIV, the reaction may be carried out by treating compound XIV with oxygen-ozone in an inert organic solvent such as chloroform, methanol or ethanol and then treating the resulting ozonide with zinc and acetic acid. As a result of the reaction, there is obtained a mixture of compound XV and its isomer (Formula G).

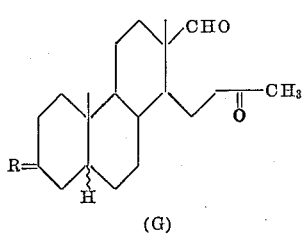

(G)

Although the mixture may be treated in the following step without separation, it can be separated by chromatography at the present stage.

In step XV, the reaction may be carried out by treating compound XV with triethylamine and acetic acid in an inert organic solvent such as benzene, toluene or xylene in a sealed tube.

The final product XVI is a 3-substituted pregn-16-en-20-one. More concretely, some of the final products may be exemplified as follows: 3α-hydroxy-5β,13β-pregn-16-en-20-one (Formula H) and its 3-acylate, 3β-hydroxy-5α,13β-pregn-16-en-20-one (Formula I) and its 3-acylate, 5β,13β-pregn-16-en-3,20-dione (Formula J) and its 3-ketal, 5α,13β-pregn-16-en-3,20-dione (Formula K) and its 3-ketal, 3α-hydroxy-5β,13α-pregn-16-en-20-one (Formula L) and its 3-acylate, 3β-hydroxy-5α,13α-pregn-16-en-20-one (Formula M) and its 3-acylate, 5β,13α-pregn-16-en-3,20-dione (Formula N) and its 3-ketal, and 5α,13α-pregn-16-en-3,20-dione (Formula O) and its 3-ketal:

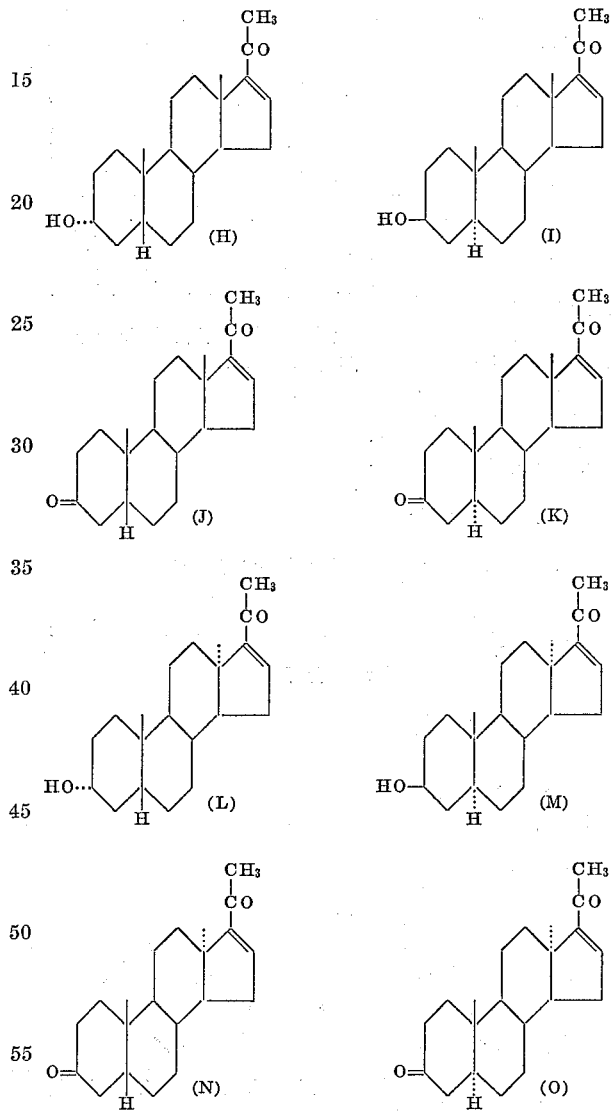

Among these products, 13β-methyl compounds have been isolated from human urine and can be converted into other steroids having medicinal effect per se according to the methods per se known to those skilled in the art. An illustrative example is shown as follows:

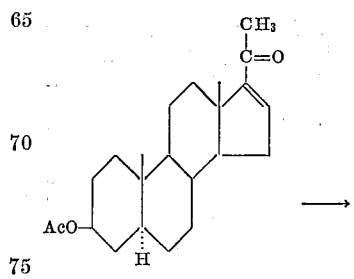

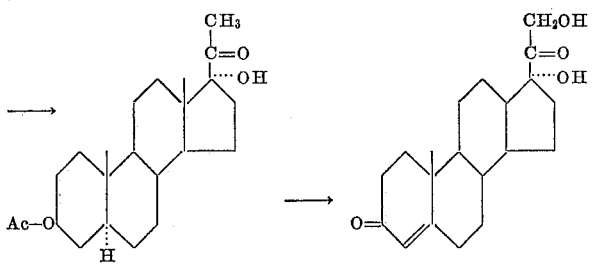

Namely, 3β - acetoxy - 5α-pregn-16-en-20-one may be changed into 3β,21-diacetoxy-17α-hydroxy-5 -pregn-16-en-20-one by the application of the methods described in Djerassi et al., J.A.C.S. 76, 1722 (1954); Moffett et al., J.A.C.S. 74, 2183 (1952); and Julian et al., J.A.C.S. 72, 362 (1950), and the latter converted into cortexolone according to the methods described Evans et al., J.C.S. 4356 (1956); J. Pataki et al., J.A.C.S. 74, 5615 (1952); and J. M. Chemerda et al., J.A.C.S. 73, 4052 (1951).

The following examples illustrate methods of carrying out the present invention, but it is to be understood that these examples are given for purposes of illustration and not of limitation.

In the examples which follow, the abbreviations and symbols have the following significances:

"g." means gram(s);
"l." means liter(s);
"ml." means milliliter(s);
"kg." means kilogram(s);
"mg." means milligram(s);
"hr." means hour(s);
"M" means molar;
"Anal. Calcd." means analysis calculated, and
"ξ" (xi) means undetermined position.

Other abbreviations and symbols have conventional significances.

*Example 1*

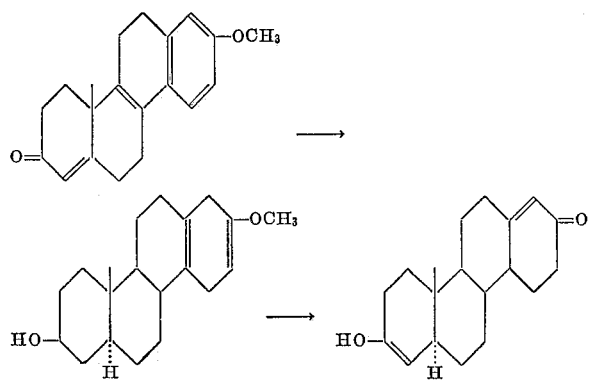

To a blue solution of 50 g. of lithium in 1.5 l. of liquid ammonia, a solution of 23 g. of 2-methoxy-10a-methyl-5,6,8,9,10,10a,11,12-octahydrochrysene-8-one in a mixture of 120 ml. of water-free dioxane, 250 ml. of water-free ether and 210 ml. of water-free ethanol is added under stirring in the course of 2 hours. After 5 minutes stirring, the solution is decolorized by the addition of 250 ml. of water-free ethanol. After removal of ammonia by inspiring warmed air, the reaction mixture has added thereto 500 ml. of water and then 500 ml. of ether with stirring under ice-cooling. The precipitated lithium hydroxide is filtered and washed three times with ether. The washing ether is combined with the filtrate.

Meanwhile, further 23.4 g. of 2-methoxy-10a-methyl-5,6,8,9,10,10a,11,12-octahydrochrysene-8-one are treated as above and the resulting washing ether and filtrate are combined with the same obtained above. The organic solvent layer is separated and the water layer is extracted with ether three times. The washing ether is combined with the organic solvent layer separated above. The resulting solution is washed three times with saturated sodium chloride solution and two times with water, and then dried over anhydrous sodium sulfate. After concentration under reduced pressure, the crystallized substance is collected by filtration. This is a mixture of two isomeric enolethers which are different from each other in the configuration of the hydrogen atom at the 8-position, M.P., 114–117° C. Yield, 39 g.

The crystals are added to 1.5 l. of methanol and to the resulting solution is added 580 ml. of 4 N hydrochloric acid little by little in 5 minutes under refluxing. After 10 minutes refluxing, the reaction mixture is poured into 2 l. of ice-water and extracted three times with chloroform. The extract is washed with water, saturated aqueous sodium bicarbonate solution and water in order and dried over anhydrous sodium sulfate. Removal of the solvent affords 38 g. of the residue. The residue is crystallized by the addition of ether to give 32 g. of a mixture of the steric isomers melting at 150–169° C.

This is a mixture of dl-3β-hydroxy-D-homo-18-nor-5α-androst-13(17a)-en-17-one (a) and dl-3β-hydroxy-D-homo-18-nor-5α,8α,14β-androst-13(17a)-en-17-one (b).

The mixture is combined with 12.6 g. of the other mixture obtained to give 44.6 g. of the same, which are chromatographed using 1 kg. of alumina (Merck II). The eluates with benzene and benzene-chloroform (9:1) are recrystallized from chloroform-acetone-ether or methanol-benzene-ether to afford 14.995 g. of (a) and 170 mg. of (b). The eluates with benzene-chloroform (9:1–3:1) are recrystallized from methanol-acetone-ether or chloroform-acetone-ether to afford 902 mg. of (a) and 1.287 g. of (b). The eluates with benzene-chloroform (3:1–1:1) are recrystallized from methanol-acetone-ether to afford 4.46 g. of (b) and 1.136 g. of (a). The uncrystallized residues from the mother liquor are combined and chromatographed on 500 g. of alumina (Merck II) again. The eluates with benzene and benzene-chloroform (3:1) are recrystallized from acetone-ether or methanol-acetone to afford 3.013 g. of (a). The eluate with benzene-chloroform (3:1) is recrystallized from methanol-acetone to afford 200 mg. of (a). The eluates with benzene-chloroform (3:1) and chloroform are recrystallized from methanol-acetone-ether to afford 1.021 g. of (b) and 47 mg. of (a). In total, 20.293 g. of (a) and 6.938 g. (b) are obtained.

dl - 3β-hydroxy-D-homo-18-nor-5α-androst-13(17a)-en-17-one (a):

M.P. 183–185° C.

IR (Nujol): 3400, 3310 (OH), 1669, 1653, 1618 (α,β-unsaturated ketone) cm.$^{-1}$.

UV: $\lambda_{max.}^{EtOH}$ 241 mμ (ε: 17600)

*Analysis.*—Calcd. for $C_{19}H_{28}O_2$ (288.41): C, 79.12; H, 9.79. Found: C, 79.38; H, 9.78.

dl - 3β - hydroxy - D - homo-18-nor-5α,8α,14β-androst-13(17a)-en-17-one (b):

M.P. 202–204° C.

IR (Nujol): 3400 (OH), 1653, 1610 (α,β-unsaturated ketone) cm.$^{-1}$.

IR (Chloroform): 3610 (OH), 2990, 1663, 1614, 885 (α,β-unsaturated ketone) cm.$^{-1}$.

UV: $\lambda_{max.}^{EtOH}$ 242 mμ (ε: 16420)

*Analysis.*—Calcd. for $C_{19}H_{28}O_2$ (288.41): C, 79.12; H, 9.79. Found: C, 79.52; H, 9.92.

With 12 ml. of acetic anhydride and 20 ml. of pyridine, 3 g. of dl-3β-hydroxy-D-homo-18-nor-5α-androst-13(17a)-en-17-one are acetylated at room temperature overnight and treated according to the usual way to afford a crude acetyl derivative, which is recrystallized from the mixture of acetone, ether and pentane to give 3.056 g. of 3β-acetate of dl-3β-hydroxy-D-homo-18-nor-5α-androst-13(17a)-en-17-one melting at 137–139° C.

*Analysis.*—Calcd. for $C_{21}H_{30}O_3$ (330.45): C, 76.32; H, 9.15. Found: C, 76.38; H, 9.37.

With 1.5 ml. of acetic anhydride and 2 ml. of pyridine, 316 mg. of dl-3b-hydroxy-D-homo-18-nor-5α,8α,14β-androst-13(17a)-en-17-one are acetylated as shown in the former example and the resulting crude acetyl derivative is recrystallized from the mixture of ether and pentane to give 313 mg. of dl-3β-acetoxy-D-homo-18-nor-5α,8α,14β-androst - 13(17a) - en - 17 - one as prisms melting at 110–113° C.

Analysis.—Calcd. for C₂₁H₃₀O₃ (330.45): C, 76.32; H, 9.15. Found: C, 76.32; H, 9.02.

(B):

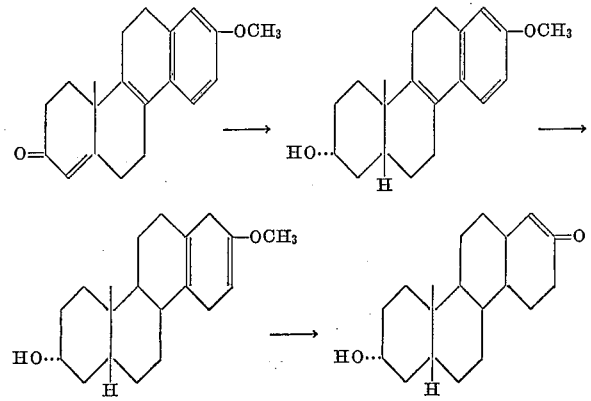

To a solution of 9 g. of lithium in 270 ml. of liquid ammonia, a solution of 3 g. of 2-methoxy-8α-hydroxy-10a - methyl - 5,6,6aβ,7,8,9,10,10aβ,11,12 - decahydrochrysene (prepared by reducing catalytically 2-methoxy-10a - methyl - 5,6,8,9,10,10a,11,12 - octahydrochrysen-8-one with palladium catalyst and then reducing the resulting 2 - methoxy - 10a - methyl - 5,6,6aβ,7,8,9,10,10aβ,11, 12-decahydrochrysen-8-one with lithium aluminum hydride) in a mixture of 22 ml. of water-free dioxane, 46 ml. of water-free ether and 38 ml. of water-free ethanol is added with stirring in the course of 1.25 hrs. under cooling (bath-temperature: —60 - —70° C.). After 5 minutes' stirring, 45 ml. of water-free ethanol is added to decompose the lithium and ammonia is removed. Adding water, the mixture is extracted with ether. The extract is washed with a saturated aqueous solution of sodium chloride, and dried on anhydrous sodium sulfate. Removing the solvent, the residue (3.17 g.) is dissolved in 125 ml. of methanol, and 49 ml. of 4 N hydrochloric acid is added dropwise in 5 minutes under refluxing. After 10 minutes refluxing, the mixture is added with water under ice-cooling, and extracted with chloroform. The extract is washed with a saturated aqueous solution of sodium bicarbonate and water, dried over anhydrous sodium sulfate, and evaporated to afford 3.028 g. of residue, which is a mixture of dl-3α-hydroxy-D-homo-18-nor-5β-androst-13(17a)-en-17-one (a) and dl-3α-hydroxy-D-homo-18-nor-5β,8α,9ξ,14β-androst-13(17a)-en-17-one (b).

Treating the residue with ether, 906.4 mg. of (a) is crystallized. The mother liquor is chromatographed on alumina. The eluates with benzene-benzene-chloroform (8:2) give 305.3 mg. of (b) and the eluates with benzene-chloroform (8:2–2:1) give 179.5 mg. of (a). Total yield of (a) is 1085.9 mg.

dl - 3α - hydroxy - D - homo - 18 - nor - 5β - androst-13(17a)-en-17-one (a):

M.P. 169–171° C. (from acetone-ether), thick plates.

IR (Nujol): 3440 (OH), 1662, 1643, 1617 (α,β-unsaturated ketone) cm.⁻¹.

UV: $\lambda_{max.}^{95\%EtOH}$ 241.3 mμ (ε: 16820)

Analysis.—Calcd. for C₁₉H₂₈O₂ (288.41): C, 79.12; H, 9.79. Found: C, 78.96; H, 9.60.

dl - 3α - hydroxy - D - homo - 18 - nor - 5β,8α,9ξ,14β-androst-13(17a)-en-17-one (b):

M.P. 168–169° C. (from acetone-ether-pentane), round plates.

IR (Nujol): 3440 (OH), 1677, 1662, 1630 (α,β-unsaturated ketone) cm.⁻¹.

UV: $\lambda_{max.}^{95\%EtOH}$ 243.8 mμ (ε: 14380)

Analysis.—Calcd. for C₁₉H₂₈O₂ (288.41): C, 79.12; H, 9.79. Found: C, 78.62; H, 9.80.

Example II (A):

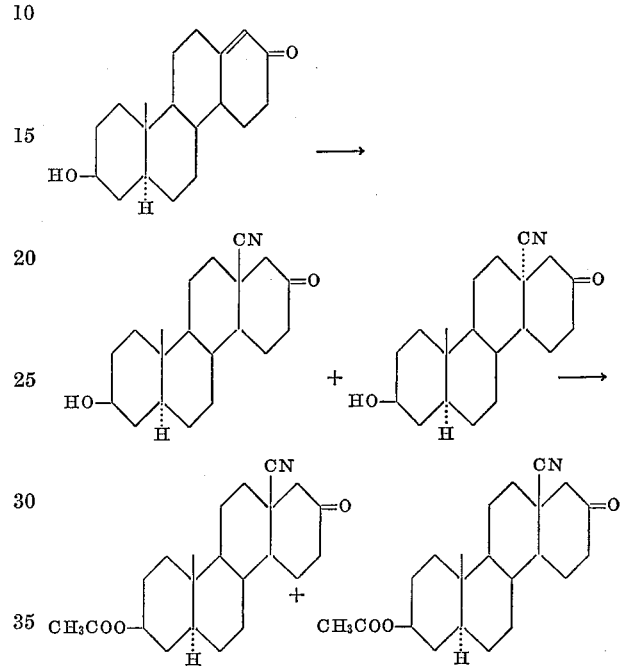

To a solution of dl-3β-hydroxy-D-homo-18-nor-5α-androst-13(17a)-en-17-one (300 mg.) in dimethylformamide (3 ml.) are added triethyl amine (0.1 ml.) and freshly distilled hydrocyanic acid (0.3 ml.) under cooling, and the mixture is heated at 80–90° C. for 5 hrs. in a sealed tube. Condensing the reaction mixture in vacuo, the residue is extracted with chloroform. The extract is washed with 2 N Na₂CO₃ and water, and dried over Na₂SO₄. Evaporating the solvent, the residue is acetylated with pyridine (2 ml.) and acetic anhydride (1.2 ml.) in conventional manner. The crude acetylated products (423 mg.) are chromatographed on alumina (12 g.) (Welm II, neutral). After recovery of starting material (38.1 mg.) from eluates of petroleum ether-benzene and by-products (46 mg.) from eluates of petroleum ether-benzene (3:7)-benzene, dl - 3β - acetoxy - 13α-cyano-D-homo-5α-androstan-17-one (4.6 mg.) is eluted with benzene-chloroform (9:1), plates, M.P. 239–241° C. (from acetone-ether). IR (Chloroform): 2239, 1725–1719, 1249, 1028 cm.⁻¹. Analysis.—Calcd. for C₂₂H₃₁O₃N (357.48): C, 73.91; H, 8.74; N, 3.92. Found: C, 73.86; H, 8.96; N, 3.92.

Then, with benzene-chloroform (7:3–5:5) there is eluted dl-3β-acetoxy-13β-cyano-D-homo-5α-androstan-17-one (54.3 mg.), prisms, M.P. 221–225° C. (from acetone-ether). IR (Chloroform): 2265, 1726–1719, 1253, 1028 cm.⁻¹. Analysis.—Calcd. for C₂₂H₃₁O₃N (357.48): C, 73.91; H, 8.74; N, 3.92. Found: C, 74.31; H, 8.88; N, 3.66.

Related compounds to dl-3β-acetoxy-13α-cyano-D-homo-5α-androstan-17-one are prepared in analogous manner: dl-3β-acetoxy-13α-cyano-D-homo-5α-androstan-17-one diethylketal, needles, M.P. 148–150° C. (from ether-pentane). IR (Nujol): 2223, 1740, 1239, 1135, 1060, 1027 cm.⁻¹. Analysis.—Calcd. for C₂₆H₄₁O₄N (431.59): C, 72.35; H, 9.58; N, 3.25. Found: C, 72.53; H, 9.52; N, 3.25.

dl - 3β - hydroxy - 13α - cyano - D - homo - 5α - androstan-17-one, prisms, M.P. 244–246° C. (from acetone-ether). IR (Nujol): 3496, 2228, 1704 cm.⁻¹. Analysis.—Calcd. for C₂₀H₂₉O₂N (315.44): C, 76.15; H, 9.27; N, 4.44. Found: C, 75.97; H, 9.51; N, 4.64.

Related compounds to dl-3β-acetoxy-13β-cyano-D-homo-5α-androstan-17-one are prepared in analogous manner: dl - 3β - acetoxy - 13β - cyano - D - homo - 5α-androstan-17-one diethylketal, prisms, M.P. 186–190° C. (from ether-pentane). IR (Nujol): 2215, 1741, 1241, 1126, 1057, 1028 cm.⁻¹. Analysis.—Calcd. for C₂₆H₄₁O₄N (431.59): C, 72.35; H, 9.58; N, 3.25. Found: C, 72.39; H, 9.59; N, 3.20.

dl - 3β - hydroxy - 13β - cyano - D - homo - 5α - androstan-17-one diethylketal, thin plates, M.P. 177–179° C. (from acetone-ether). IR (Nujol): 3549, 3285, 2229, 1130, 1058, 974 cm.⁻¹. Analysis.—Calcd. for $$C_{24}H_{39}O_3N \cdot \tfrac{1}{3}H_2O$$

(395.56): C, 72.87; H, 10.10; N, 3.54. Found: C, 72.95; H, 10.22; N, 3.48.

dl - 3β - hydroxy - 13β - cyano - D - homo - 5α - androstan-17-one, thin plates, M.P. 239–240° C. (from acetone-ether). IR (Nujol): 3505, 2232, 1703 cm.⁻¹. Analysis.—Calcd. for C₂₀H₂₉O₂N (315.44): C, 76.15; H, 9.27; N, 4.44. Found: C, 76.18; H, 9.42; N, 4.51.

(B):

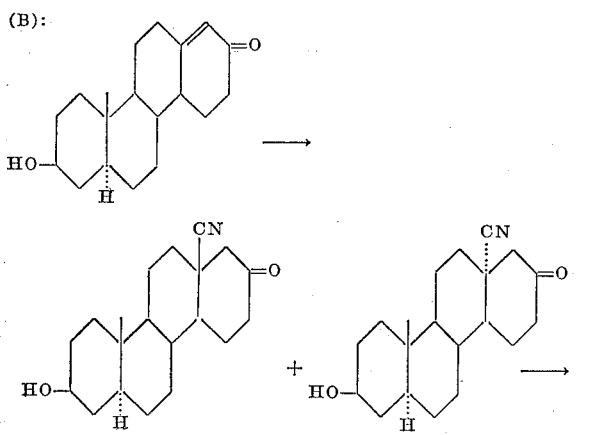

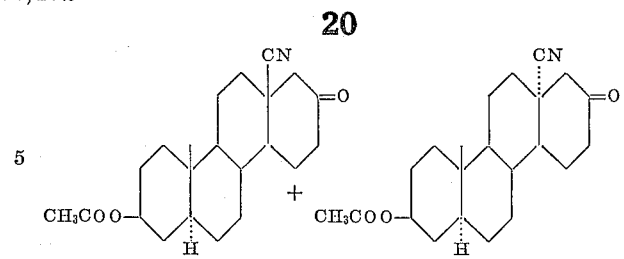

dl-3β-hydroxy-D-homo-18-nor-5α-androst - 13(17a)-en-17-one (288 mg.), potassium cyanide (130 mg.) and glacial acetic acid (120 mg.) are dissolved in 95% ethanol (15 ml.) and water (0.5 ml.), and the mixture is heated at 80° C. for 6 hrs. Treating in the same manner with Example II(A), the crude acetylated products (384 mg.) are chromatographed on alumina (15 g.) (Welm III, neutral) to afford dl-3β-acetoxy-13α-cyano-D-homo-5α-androstan-17-one (27.4 mg.) and dl-3β-acetoxy-13β-cyano-D-homo-5α-androstan-17-one (59.7 mg.).

(C):

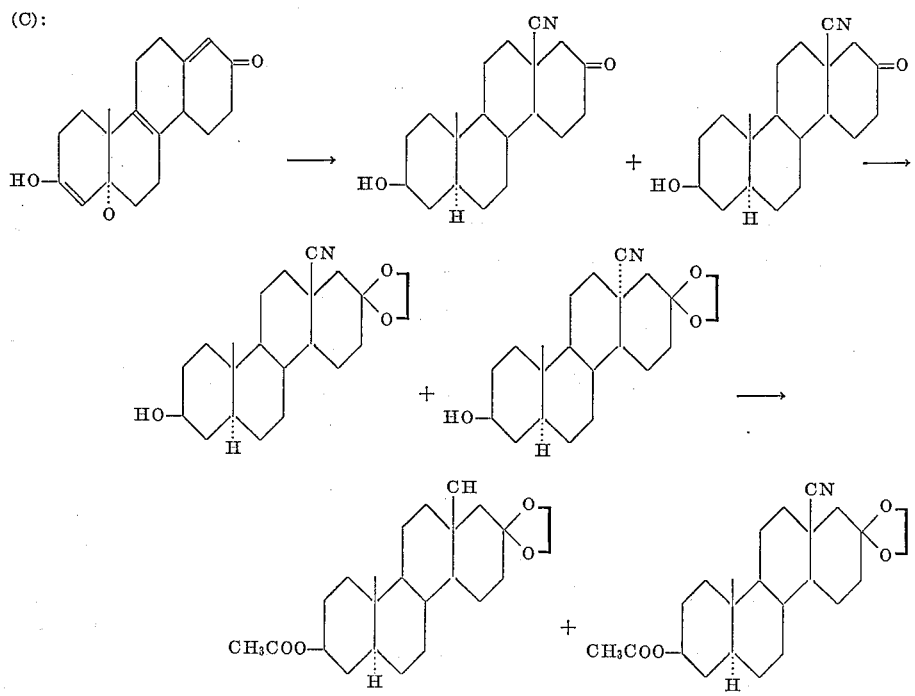

dl-3β-hydroxy-D-homo-18-nor-5α-androst - 13(17a)-en-17-one (1 g.), potassium cyanide (450 mg.) and ammonium chloride (325 mg.) are dissolved in methanol (16 ml.) and water (4 ml.), and the mixture is refluxed for 6.5 hrs. Condensing the mixture, water is added to the residue, and the solution is extracted with chloroform-methanol (4:1). The extract is washed with water, and dried over Na₂SO₄. After evaporation of the solvent, crude products (1.276 g.) are ketalized with ethyleneglycol (1 ml.) and p-toluenesulfonic acid monohydrate (50 mg.) in anhydrous benzene (150 ml.) in conventional manner. And, then, the crude ketal compounds (1.433 g.) are acetylated with pyridine (10 ml.) and acetic anhydride (6 ml.) in conventional manner. The thus produced crude acetylated ketal compounds are chromatographed on alumina (Welm II, neutral) (60 g). From eluates with petroleum ether-benzene (7:5–5:5) is obtained dl-3β-acetoxy-13β-cyano-D-homo-5α-androstan-17-one ethylene ketal (284.0 mg.), thick prisms, M.P. 235–238° C. (from acetone-ether). IR (Nujol): 2233, 1730, 1242, 1025, 1103, 953 cm.⁻¹. Analysis.—Calcd. for C₂₄H₃₆O₄N (401.53): C, 71.79; H, 8.79; N, 3.49. Found: C, 71.88; H, 8.73; N, 3.51.

From eluates with benzene is obtained dl-3β-acetoxy-13β-cyano-D-homo-5α-androstan-17-one (50 mg.), which is not subjected to the ketalization.

All mother liquors and uncrystallized eluates are combined, and chromatographed on alumina (30 g.). From eluates with petroleum ether-benzene (8:2) is obtained dl-3β-acetoxy-13β-cyano - D - homo-5α-androstan-17-one-ethylene ketal (145.4 mg.). Then, from eluates with petroleum ether-benene (6:3–5:5) is obtained dl-3β-acetoxy-13α-cyano - D - homo-5α-androstan-17-one ethyleneketal (78.6 mg.), plates, M.P. 224–226° C. (from acetone-ether). IR (Nujol): 2246, 1725, 1239, 1103, 1030 cm.−1 *Analysis.*—Calcd. for $C_{24}H_{35}O_4N$ (401.35): C, 71.79; H, 8.79; N, 3.49. Found: C, 71.46, H,8.80; N, 3.52.

Uncrystallized portions are again combined and chromatographed on alumina (15 g.). dl-3β-acetoxy-13α-cyano-D-homo-5α-androstan-17-one ethyleneketal (232.7 mg.) and dl-3β-acetoxy-13β-cyano-D-homo-5α-androstan-17-one ethyleneketal (69.2 mg.) are recovered. One more chromatography gives the former (35.2 mg.) and the latter (10.2 mg.). Totally, 346.5 mg. of dl-3β-acetoxy-13α-cyano-D-homo-5α-androstan-17 - one ethyleneketal, 508.8 mg. of dl-3β-acetoxy-13β-cyano-D-homo-5α-androstan-17-one ethyleneketal and 50.5 mg. of dl-3β-acetoxy-13β-cyano-D-homo-5α - androstan - 17 - one are yielded.

(D):

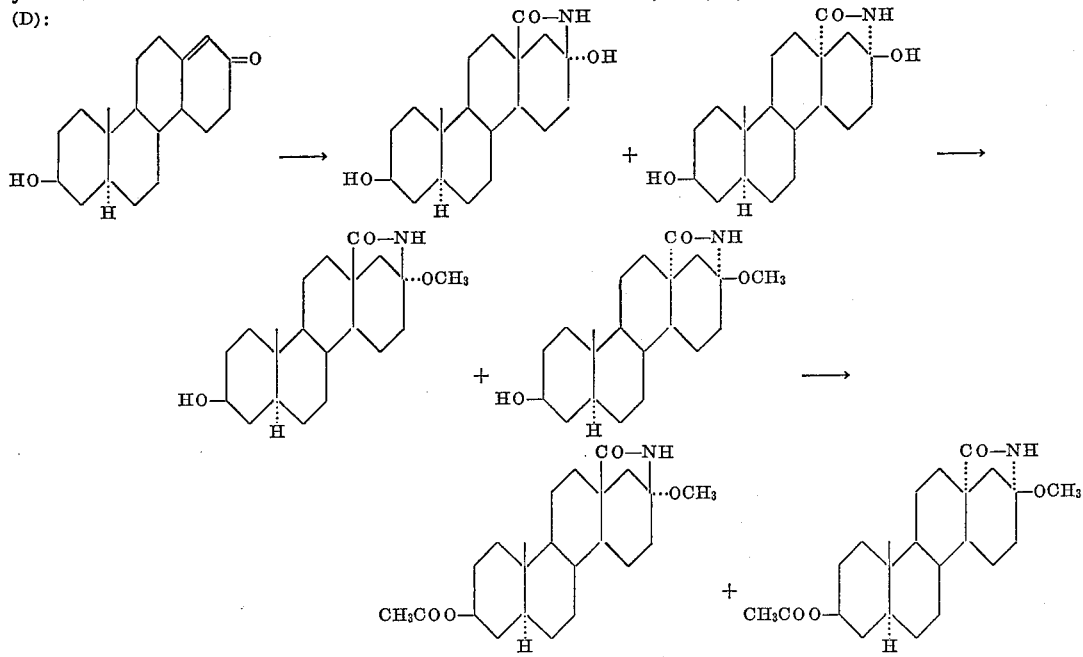

dl-3β-hydroxy-D-homo-18-nor-5α - androst - 13(17α)-en-17-one (14.33 g.) and potassium cyanide (6.45 g.) are dissolved in methanol (165 ml.) and water (33 ml.), and the mixture is refluxed for 2.5 hrs. under nitrogen atmosphere. Evaporating the mixture in vacuo, there are obtained crude products (15.82 g.). The crude products (10.4 g.) are dissolved in anhydrous methanol (50 ml.), and 34% methanolic HCl is added under cooling, and the mixture is allowed to stand for 2 days at room temperature. After removing of methanol, the residue is extracted with chloroform. The extract is washed with 2 N $Na_2CO_3$ and water, dried over $Na_2SO_4$ and the solvent is distilled off. The obtained crude ether compound (10.7 g.) is then acetylated with pyridine (30 ml.) and acetic anhydride (20 ml.) in conventional manner to afford crude acetylated products (13.17 g.), which are chromatographed on alumina (Merck II) (250 g.).

After recovery of by-products (125 mg.) from eluates with petroleum ether-benzene (1:1–1:2), eluates with petroleum ether - benzene (1:2)-benzene - chloroform (9:1) give dl-3β-acetoxy - 17α - methoxy - 17 - amino-D-homo - 5α - androstan - 18 - amide (1.91 g.), needles or columns, M.P. 260–262° C. (from chloroform-acetone-ether or acetone-ether). IR (Chloroform): 3475, 3300, 1724, 1710, 1700, 1253, 1025 cm.−1. *Analysis.*—Calcd. for $C_{23}H_{35}O_4N$ (389.52): C, 70.92; H, 9.06; N, 3.60. Found: C, 70.95; H, 9.10; N, 3.68.

Then, from eluates with benzene-chloroform (8:2–6:4) is obtained dl-3β-acetoxy-17β-methoxy-17-amino-D-homo-5α,18α-androstan-18-amide (797 mg.), prisms, M.P. 237–240° C. (from acetone-ether). IR (Chloroform): 3424, 3241, 1727, 1708, 1252, 1028. cm.−1 *Analysis.*—Calcd. for $C_{23}H_{35}O_4N$ (389.52): C, 70.92; H, 9.06; H, 3.60. Found: C, 70.88; H, 9.05; N, 3.53.

Related compounds to dl-3β-acetoxy-17β-methoxy-17-amino-D-homo-5α,18α-androstan-18-amide are prepared in analogous manner: dl - 3β - acetoxy - 17β - ethoxy-17-amino-D-homo-5α-18α-androstan-18-amide prisms, M.P. 205–207° C′ (from acetone-ether). IR (Nujol): 3285, 3100, 1737, 1711, 1233, 1028 cm.¹. *Analysis*—Calcd. for $C_{24}H_{37}O_4N$ (403.54): C, 71.43; H, 9.24; N, 3.47. Found: C, 71.70; H, 9.25; N, 3.42.

dl-3β-acetoxy-17β-hydroxy-17-amino-D-homo - 5α,18α-androstan-18-amide, thin needles, M.P. 300–302° C. (from methanol). IR (Nujol): 3277, 3247, 1728, 1687, 1262, 1035 cm.−1. *Analysis.*—Calcd. for $C_{22}H_{33}O_4N$ (375.49): C, 70.37; H, 8.86; N, 3.73. Found: C, 70.45; H, 8.77; N, 3.54.

dl-3β,17β-diacetoxy-17-amino-D-homo-5α,18α - androstan-18-amide, plates, M.P. 210–212° C. (from chloroform-ether). IR (Chloroform): 3438, 1727, 1710, 1252, 1022 cm.−1. *Analysis.*—Calcd. for $C_{24}H_{35}O_5N$ (417.53): C, 69.03; H, 8.45; N, 3.35. Found: C, 69.06; H, 8.31; N, 3.14.

Related compounds to dl-3β-acetoxy-17α-methoxy-17-amino-D-homo-5α-androstan-18-amide are prepared in analogous manner: dl-3β-acetoxy-17α-ethoxy-17-amino-D-homo-5α-androstan-18-amide, plates, M.P. 264–266° C. (from acetone-ether). IR (Nujol): 3210, 3075, 1730, 169.0, 1237, 1227, 1024 cm.−1. *Analysis.*—Calcd. for $C_{24}H_{37}O_4N$ (403.54): C, 71.43; H, 9.24; N, 3.47. Found: C, 70.91; H, 9.14; N, 3.49.

dl-3β-acetoxy-17α-hydroxy-17-amino-D-homo-5α - androstan-18-amide, long prisms, M.P. 264–267° C. (from chloroform-ether). IR (Chloroform): 3596, 3455, 3306, 1722, 1706, 1254, 1023 cm.−1. *Analysis.*—Calcd. for $C_{22}H_{33}O_4N$ (375.49): C, 70.37; H, 8.86; N, 3.73. Found: C, 70.01; H, 8.88; N, 3.53.

dl-3β,17α-diacetoxy-17-amino-D-homo-5α - androstan-18-amide, needles, M.P. 254.5–256° C. (from chloroform-ether). IR (Chloroform): 3454, 1724, 1709, 1252, 1023 cm.−1. *Analysis.*—Calcd. for $C_{24}H_{35}O_5N$ (417.53):

C, 69.03; H, 8.45; N, 3.35. Found: C, 68.73; H, 8.39; N, 3.15.

(E):

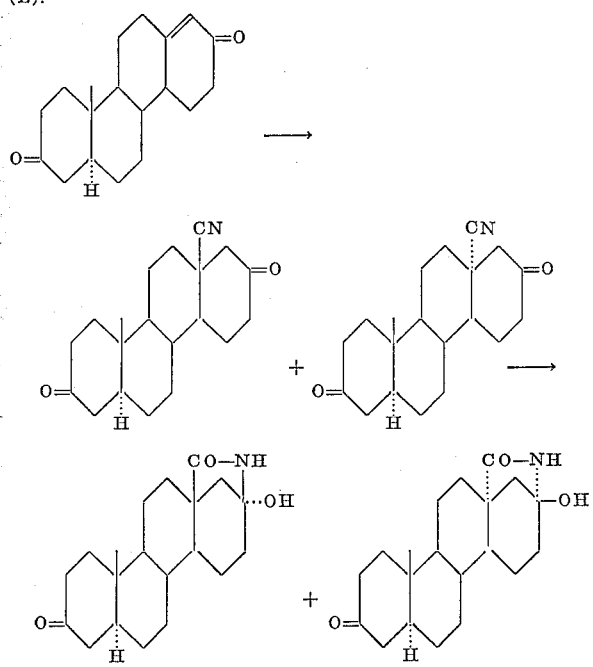

dl-D-homo-18-nor-5α-androst-13(17α)-en-3,17 - dione (prepared by the oxidation of dl-3β-hydroxy-D-homo-18-nor-5α-androst-13(17α)-en-17-one with chromic acid) (1.777 g.) and potassium cyanide (0.8 g.) are dissolved in methanol (25 ml.) and water (5 ml.) and the mixture is refluxed for 2 hrs. Evaporating in vacuo, the residue is extracted with chloroform. The extract is washed with water, dried over $Na_2SO_4$, and the solvent is distilled off. The residue (2.33 g.) is chromatographed on Florisil (70 g.). From eluates with chloroform is obtained dl-13β-cyano-D-homo-5α-androstane - 3,17 - dione (246.7 mg.), prisms, M.P. 226–228° C. (from acetone-ether). IR (Chloroform): 2216, 1724, 1712 cm.$^{-1}$. Analysis—Calcd. for $C_{20}H_{27}O_2N$ (313.42): C, 76.64; H, 8.68; N, 4.47. Found: C, 76.24; H, 8.60; N, 4.46.

From eluates with chloroform-methanol (99.5:0.5–99:1) is obtained dl-17α-hydroxy-17-amino-D-homo-5α-androstan-3-one 18-amide (191.9 mg.), thin prisms, M.P. 283–289° C. (from chloroform-methanol-ether). IR (Nujol): 3477, 3227, 1717, 1690 cm.$^{-1}$. Analysis.—Calcd. for $C_{20}H_{29}O_3N$ (331.24): C, 72.47; H, 8.82; N, 4.23. Found: C, 71.63; H, 9.11; N, 4.15.

Then, eluates with chloroform-methanol (99:1–97.5:2.5) give dl-17β-hydroxy-17-amino-D-homo-5α,18α-androstan-3-one 18-amide (293 mg.), needles, M.P. 252–258° C. (from methanol-chloroform-ether). IR (Nujol): 3441, 3286, 1712, 1690 cm.$^{-1}$. Analysis.—Calcd. for $C_{20}H_{29}O_3N$ (331.24): C, 72.47; H, 8.82; N, 4.23. Found: C, 72.16; H, 8.98; N, 4.34.

Related compounds to dl-17β-hydroxy-17-amino-D-homo-5α,18α-androstan-3-one 18-amide and dl-17α-hydroxy-17-amino-D-homo-5α-androstan-3-one 18-amide are prepared in analogous manner: dl-17β-methoxy-17-amino-D-homo-18α-androstan-3-one 18-amide, needles, M.P. 254–258° C. (from methanol). IR (chloroform): 3435, 1710, 1129, 1106, 1093 cm.$^{-1}$. Analysis.—Calcd. for $C_{21}H_{31}O_3N$ (345.47): C, 73.00; H, 9.05; N, 4.05. Found: C, 72.94; H, 9.25; N, 3.94.

dl-17α-methoxy-17-amino-D-homo-androstan-3-one 18-amide, plates, M.P. 251–256° C. (from chloroform-acetone-ether). IR (chloroform): 3436, 1707, 1124, 1108, 1037 cm.$^{-1}$. Analysis.—Calcd. for $C_{21}H_{31}O_3N$ (345.47): C, 73.00; H, 9.05; N, 4.05. Found: C, 72.76; H, 9.00; N, 4.00.

(F):

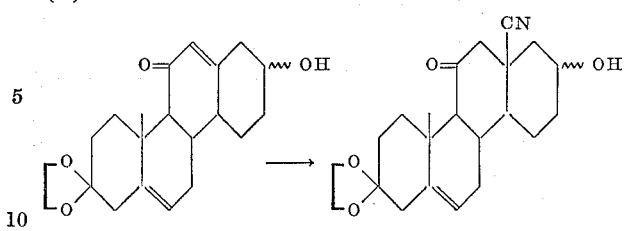

dl-17ξ-hydroxy-D-homo - 18 - nor-androsta-5,12-diene-3,11-dione 3-ethyleneketal (1.451 g.), potassium cyanide (548 mg.) and ammonium chloride (338 mg.) are dissolved in dimethylformamide (73 ml.) and water (7.3 ml.), and the mixture is refluxed for 7 hrs. After addition of ammonium chloride (113 mg.), the solvent is distilled off in vacuo. To the residue is added a little portion of water, and the mixture is extracted with chloroform. The extract is washed with water, dried over $Na_2SO_4$, and the solvent is removed in vacuo. The residue (1.6 g.) is recrystallized to afford dl-13β-cyano-17ξ-hydroxy-D-homo-androst-5-en-3,11-dione 3-ethyleneketal (1.437 g., 91.6%), thick plates or columns, M.P. 236.5–238.5° C. or 239–241° C., dimorph (from methanol or acetone-ether). $[α]_D^{21}$ —4.8±2°, —4.0±2° (chloroform C: 1.233% or 1.081%). UV (ethanol): 205.3 mμ (ε: 2190, 2210). IR (chloroform): 2245, 1716, 1109 cm.$^{-1}$. Analysis.—Calcd. for C, 70.75; H, 7.96; N, 3.70. Found: C, 70.85; H, 7.86; N, 3.81.

(G):

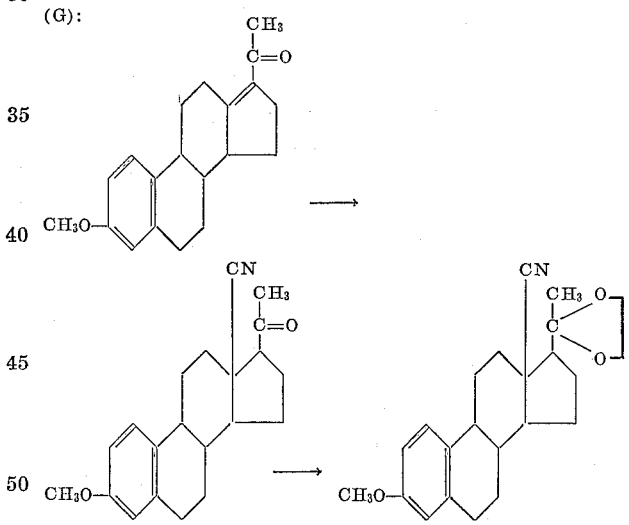

dl-3-methoxy - 18 - nor - 19 - nor - pregna - 1,3,5(10), 13(17)-tetraen-20-one (1.0 g.), potassium cyanide (414 mg.) and ammonium chloride (240 mg.) are dissolved in dimethylformamide (20 ml.) and water (2 ml.), and the mixture is refluxed for 14.5 hrs. After addition of acetic acid (0.5 ml.), the mixture is extracted with chloroform. Washing the extracts with water, and drying over $Na_2SO_4$, the solvent is distilled off. The residue (1.198 g.) is ketalized with ethylene glycol (12 ml.) and p-toluenesulfonic acid monohydrate (60 ml.) in anhydrous toluene (150 ml.) in conventional manner. The crude products (1.415 g.) are chromatographed on alumina (Welm, neutral) (60 g.). From eluates with petroleum ether-benzene (7:3) is obtained dl-3-methoxy-13ξ-cyano-17ξ-pregna-1,3,5(10)-trien-20-one ethyleneketal (666.5 mg.), plates, M.P. 147–150° (from acetone-ether). IR (chloroform): 2220, 1613, 1580, 1501 cm.$^{-1}$. Analysis.—Calcd. for $C_{23}H_{29}O_3N$ (367.47): C, 75.17; H, 7.95; N, 3.81. Found: C, 75.23; H, 7.93; N, 3.76. From eluates with petroleum ether-benzene (5:5) is afforded dl-3-methoxy-13β-cyano - 19 - nor-pregna - 1,3,5(10)-trien-20-one ethylene ketal (236 mg.), columns, M.P. 176–178° C. (from acetone), of which the configuration of cyano-group is confirmed by identification with estrone after reduction of the cyano-group. IR (chloroform): 2214, 1612, 1580, 1500 cm.⁻¹. *Analysis.*—Calcd. for $C_{23}H_{29}O_3N$ (367.47): C, 75.17; H, 7.95; N, 3.81. Found: C, 75.24; H, 8.10; N, 3.85.

Related compounds to dl-3-methoxy-13ƒ-cyano-17ƒ-pregna-1,3,5(10)-trien-20-one ethyleneketal and dl-3-methoxy - 13β - cyano - 19 - nor - pregna-1,3,5(10)-trion-20-one ethyleneketal are prepared in analogous manners: dl-3-methoxy-13ƒ-cyano-19-nor-17ƒ - pregna - 1,3,5(10) - trien-20-one, plates, M.P. 162–165° C. (from acetone-ether). IR (Chloroform): 2226, 1715, 1613, 1580, 1501 cm.⁻¹. *Analysis.*—Calcd. for $C_{21}H_{25}O_2N$ (323.42): C, 77.98; H, 7.79; N, 4.33. Found: C, 77.71; H, 7.84; N, 4.42.

dl-3-methoxy-13β-cyano-19-nor-pregna-1,3,5(10)- trien-20-one, columns, M.P.. 196–199° C. (from acetone-ether). IR (Chloroform): 2446, 1715, 1611, 1578, 1500 cm.⁻¹. *Analysis.*—Calcd. for $C_{21}H_{25}O_2N$ (323.42): C, 77.98; H, 7.79; N, 4.33. Found: C, 77.98; H, 7.79; N, 4.32.

The starting compound in this example, dl-3-methoxy-18-nor-19-nor-pregna-1,3,5(10),13(17)-tetraen-20-one, is prepared by refluxing mildly 6-methoxy-2-tetralone with an equimolar quantity of vinyl methyl ketone in the presence of sodium methoxide in methanol, refluxing the resulting 7-methoxy-1,2,3,4,9,10 - hexahyraphenanthren-2-one with 4-oxo-pentan-1-bromide ethyleneketal in the presence of sodium hydride in toluene, treating thus obtained 1-(4-ethylenedioxy-pentyl)-7-methoxy-1,2,3,4,9,10-hexahydrophenanthrene with metallic lithium and liquid ammonia, followed with allowing to stand the resulting product with chromic acid in pyridine at a temperature between 20 and 23° C., boiling thus obtained 1,(4-ethyl-enedioxy - pentyl - 7 - methoxy-1,2,3,4,4a,9,10-octahydro-phenanthren-2-one with hydrochloric acid in acetone and boiling the resulting 1-(4-oxo-pentyl)-7-methoxy-1,2,3,4, 4a,9,10,10a-octahydrophenanthren-2-one in the presence of sodium methoxide in a mixture of methanol and dioxane.

(H):

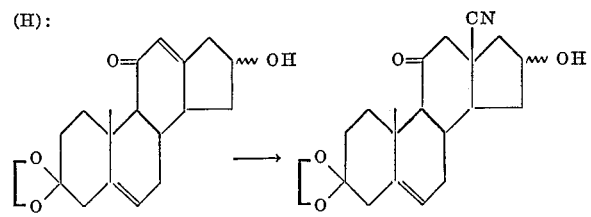

Triethyl aluminium (0.20) ml.) is dissolved in anhydrous tetrahydrofuran (1.5 ml.) under nitrogen-current, and hydrocyanic acid (0.20 ml.) is added to the solution under ice-cooling. To this solution is added another solution of dl-17ƒ-hydroxy-D-homo-18-nor-androsta-5,12-diene-3, 11-dione 3-ethyleneketal (20.0 mg.) in anhydrous tetrahydrofuran (3 ml.) under ice-cooling. Then the mixture is allowed to stand at room temperature for one night, and poured into ice-water. After removal of tetrahydrofuran in vacuo, the remaining aqueous solution is acidified with 4 N H₃PO₄, adjusted to pH 3.0, and extracted with chloroform. The extract is washed with water, NaHCO₃ solution (ice-cooled) and water in turn, dried over Na₂SO₄ and evaporated in vacuo. The residue (19.8 mg.) is recrystallized from methanol to afford dl-13β-cyano-17ƒ-hydroxy-D-homo-androst-5-ene-3,11-dione 3-ethyleneketal (15.6 mg.), which is identified to the product of Example II (F).

(I):

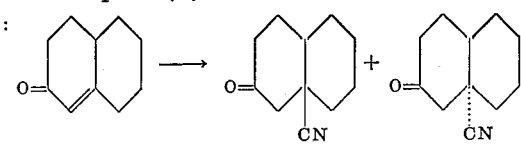

A mixture of 2,3,4,4a,5,6,7,8-octahydronaphthalen-2-one (3.0 g.), potassium cyanide (2.6 g.), ammonium chloride (1.6 g.) and methanol (80 ml.) is refluxed for 8 hrs. Then, the solvent is removed in vacuo, and the residue is treated with benzene and cold water. The aqueous layer is extracted with benzene. The whole benzene extract is dried over MgSO₄, and the solvent is evaporated in vacuo. The remaining yellow oil (3.43 g.) is rectified under pressure of 6 mm. Hg: the first fraction: 133–140° C.; 0.24 g. of colorless oil, the second fraction: 143–147° C.; 0.38 g. of yellow oil, the third fraction: 162–165° C.; 1.51 g. of yellow oil. The first fraction is identified with the starting material. The second fraction may consist of trans-8a-cyano-1,2,3,4,4a, 5,6,7,8,8a-decahydronaphthalen-2-one, and the third may be cis-8a-cyano-1,2,3,4,4a,5,6,7,8,8a-decahydronaphthalen-2-one.

The analytical data of the cis-isomer is as follows:— Calcd. for $C_{11}H_{15}NO$: C, 74.54; H, 8.53; N, 7.90. Found: C, 74.30; H, 8.73; N, 7.59.

(J):

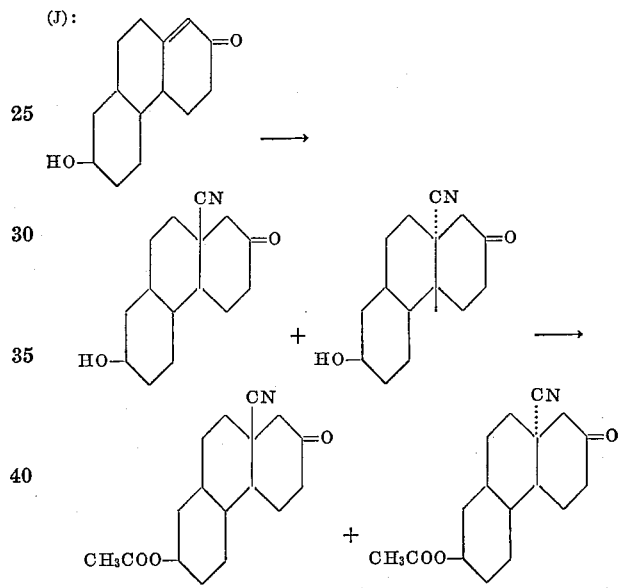

A mixture of 7β-hydroxy-2,3,4,4aα, 4bβ,5,6,7,8,8aα,9, 10-dodecahydrophenanthren-2-one (prepared by the reduction of 1-methyl-1,2,3,4,9,10-hexahydrophenanthren-2-one with lithium in liquid ammonia in the presence of 2-methoxyethanol, followed by the hydrolysis of the resulting product with hydrochloric acid) (1320 mg.), potassium cyanide (780 mg.), ammonium chloride (544 mg.), methanol (26 ml.) and water (1.3 ml.) is refluxed for 4 hours. After cooling, glacial acetic acid (1.0 ml.) is added, and the solvent is removed in vacuo. To the residue is added water (60 ml.), and the solution is extracted with chloroform. The extract is washed with water, dried over Na₂SO₄, and chloroform is evaporated. The residue (1350 mg.) is acetylated with acetic anhydride (8 ml.) and pyridine (12 ml.) according to an usual method. Crude acetylated products (1634 mg.) are chromatographed on alumina (30 g.) (Welm, neutral). Eluates with petroleum ether-benzene (1:1-benzene-benzene-chloroform (9:1–4:1) are combined (1172 mg.), and recrystallized from ether-acetone to afford 7β-acetoxy-10aβ-cyano-1,2,3,4,4aα,4bβ,5,6,7,8,8aα,9,10,10aβ - tetradecahydrophenanthren - 2 - one (49.8 mg.), 7β-acetoxy-10aα-cyano-1,2,3,4,4aα,4bβ,5,6,7,8,8aα,9,10,10aα - tetradecahydrophenanthren-2-one (108.7 mg.), and a mixture of them (739.5 mg.).

7β-acetoxy-10aβ-cyano - 1,2,3,4,4aα,4bβ,5,6,7,8,8aα,9, 10,10aβ - tetradecahydrophenanthren - 2 - one: Columns, M.P. 153–154° C. IR (Cloroform); 2240, 1725 cm.⁻¹. *Analysis.*—Calcd. for $C_{17}H_{23}O_3N$ (289.36): C, 7.56; H, 8.01; N, 4.84. Found: C, 70.71; H, 7.86; N, 4.70.

7β - acetoxy - 10aα - cyano - 1,2,3,4,4aα,4bβ,5,6,7,8,

8aα,9,10,10aα - tetradecahydrophenanthren - 2 - one: Flat columns, M.P. 190–194° C. IR (Chloroform): 2235, 1725 cm.$^{-1}$.

*Analysis.*—Calcd. for $C_{17}H_{23}O_3N$ (289.36: C, 70.56; H, 8.01; N, 4.84. Found: C, 70.44; H, 8.09; N, 4.79.

The mixture of them: Columns, M.P. 132–185° C. (almost at 148° C.).

*Analysis.*—Calcd. for $C_{17}H_{23}O_3N$ (289.36): C, 70.56; H, 8.01; N, 4.84. Found: C, 70.58; H, 8.04; N, 5.12. The mixture may be for the most part 7β-acetoxy-10aβ-cyano - 1,2,3,4,4aα,4bβ,5,6,7,8,8aα,9,10,10aβ - tetradecahydrophenanthren-2-one.

(K):

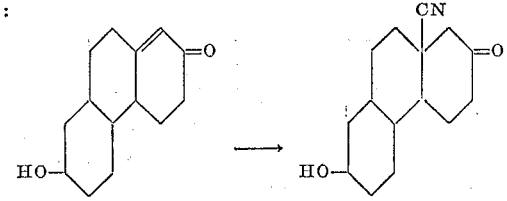

A mixture of 7β-hydroxy-2,3,4,4aα,4bβ,5,6,7,8,8aα,9,10-dodecahydrophenanthren-2-one (660 mg.), potassium cyanide (390 mg.), ammonium chloride (240 mg), dimethylformamide (13.5 ml.) and water (1.3 ml.) is heated on a water-bath (100° C.) for 8 hrs. After cooling, glacial acetic acid (0.5 ml.) is added, and the solvent is removed in vacuo. To the residue is added water (30 ml.), and the solution is extracted with chloroform. The extract is washed with water, dried over $Na_2SO_4$, and chloroform is evaporated. The residue (721 mg) is recrystallized from acetone-ether to afford 7β-hydroxy-10aβ - cyano - 1,2,3,4,4aα,4bβ,5,6,7,8,8aα,9,10,10aβ-tetradecahydrophenanthren-2-one (357.3 mg), prisms, M.P. 199–203° C. IR (Nujol): 3525, 2242, 1710 cm.$^{-1}$.

*Analysis.*—Calcd. for $C_{15}H_{21}O_2N$ (247.33): C, 72.84; H, 8.56; N, 5.66. Found: C, 72.68; H, 8.50; N, 5.82. An acetate of the product is identified with the same obtained in Example II(J). The mother liquor of the recrystallization is evaporated and the residue (220 mg.) is chromatographed on alumina (8 g.) (Welm, neutral). Eluates with benzenechloroform (1:1–1:2) are recrystallized from acetone-ether to afford 87.3 mg. of 7β-hydroxy - 10aβ - cyano - 1,2,3,4,4aα, 4bβ,5,6,7,8,8aα,9,10, 10aβ-tetradecahydrophenanthren-2-one. Total yield of the product is 444.6 mg.

*Example III*

(A):

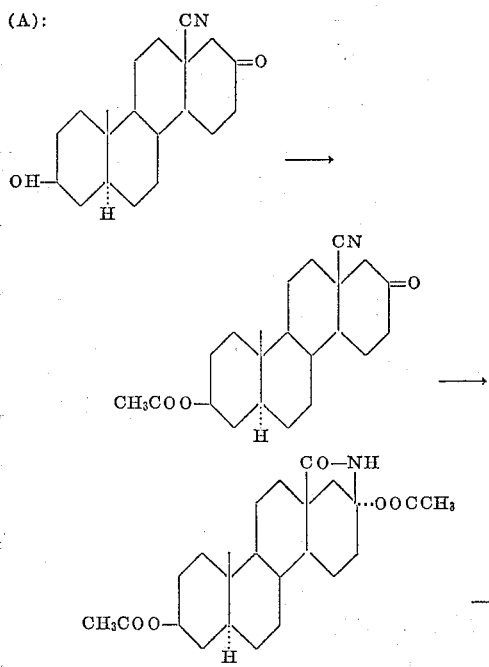

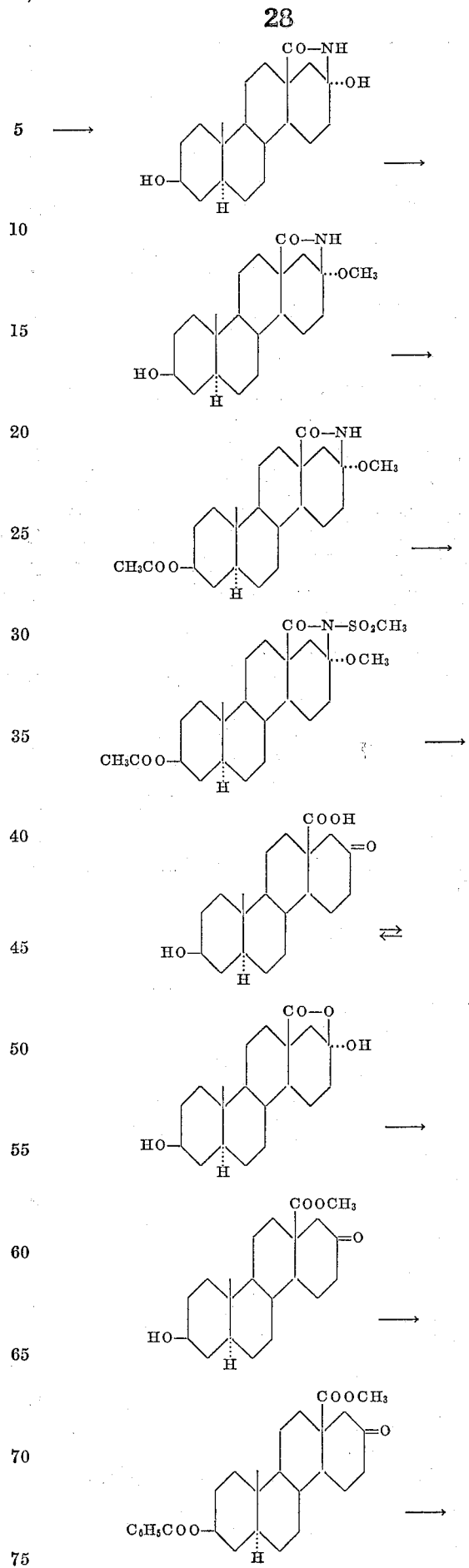

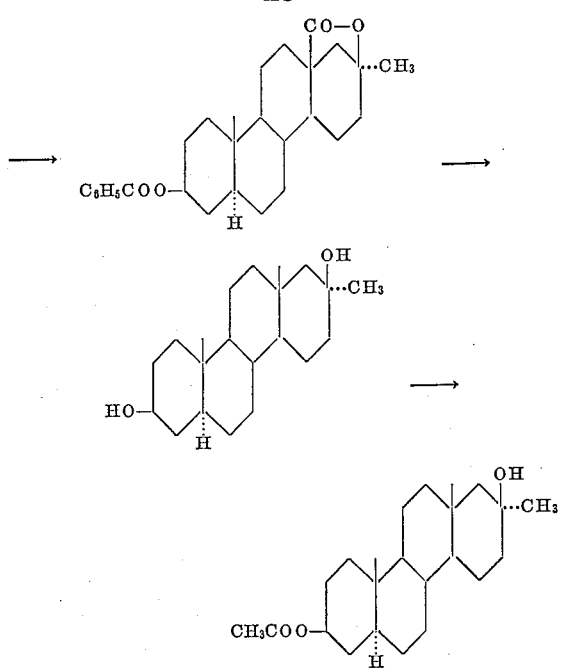

One hundred mg. of dl-3β-acetoxy-13β-cyano-D-homo-5α-androstan-17-one prepared quantitatively from dl-3β-hydroxy-13β-cyano-D-homo-5α-androstan-17-one by conventional acetylation with acetic anhydride and pyridine, is mixed with 60 mg. of potassium hydroxide and 6 ml. of methanol and refluxed for 0.5 hr. in a stream of nitrogen. Methanol is removed, 5 ml. of water and a small quantity of concentrated hydrochloric acid are added to the reaction mixture, crystals thereby separated out are filtered and dried at 100° C. on phosphorus pentoxide in vacuum. The crude products are dissolved in 3 ml. acetic anhydride, 20 mg. of p-toluenesulfonic acid monohydrate and 10 mg. of anhydrous sodium acetate added to the mixture, which is then evaporated in vacuo. The residue is treated with water and chloroform. The chloroform extract is washed with 2 N-sodium carbonate and water successively, then dried over sodium sulfate. After removal of the solvent, the residue (114.3 mg.) is chromatographed on alumina (3 g.). The crystals of dl-3β,17α-diacetoxy-17β-amino-D-homo-5α-androstan-18-oic acid lactam, 32.6 mg. are obtained from the eluates of petroleum ether-benzene (3:7)-benzene-benzene-chloroform (9:1 and 7:3) after recrystallization from acetone-ether.

dl - 3β,17α - diacetoxy - 17α - amino - D-homo - 5α - androstan-18-oic acid lactam needles from chloroform-ether, M.P. 254.5–256° C.

IR: $\nu_{max.}^{CHCl_3}$ 3454, 1724, 1709, 1252, 1023 cm.$^{-1}$

Analysis.—Calcd. for $C_{14}H_{35}O_5N$ (417.53); C, 69.03, H, 8.45, N, 3.35. Found: C, 68.73, H, 8.39, N, 3.15.

Following eluates gives a crystalline compound regarded as bis-type compound, 8.7 mg. of thin prisms, M.P. 300° C. (from chloroform-ether), by elution of benzene-chloroform (5:5 and 3:7)-chloroform-chloroform-methanol (99:1).

IR: $\nu_{max.}^{Nujol}$ 3485 (OH); 3220, 3100 (NH), 2222 (CN); 1733, 1240, 1026 (CH$_3$COO), 1692 (CONH) cm.$^{-1}$.

Analysis.—Calcd. for $C_{44}H_{64}O_7N_2$ (732.96): C, 72.10, H, 8.80, N, 3.82. Found: C, 72.03, H, 8.63, N, 3.69.

dl - 3β, 17α - diacetoxy - 17β - amino - D - homo - 5α-androstan-18-oic acid lactam is quantitatively hydrolyzed by conventional alkaline treatment to give dl-3β,17α-dihydroxy-17β-amino-D-homo-5α-androstan - 18 - oic acid lactam. To a suspension of 502 mg. of the latter in 70 ml. of dehydrated methanol are added 41 g. of 49% (by weight) methanolic hydrochloric acid solution to dissolve crystals suspended. After allowing to stand 1 night, the reaction mixture is distilled to remove methanol under reduced pressure and extracted 3 times with chloroform. The combined extract is washed with 2 N-sodium carbonate solution, dried over sodium sulfate, then evaporated to dryness. The crude crystals (529.6 mg.) are obtained; pure crystals of dl-17β-amino-17α-methoxy-3β-hydroxy-D-homo-5α-androstan-18-oic acid lactam, M.P. 229–231° C., (205.8 mg.) are obtained by twice repeated recrystallization from acetone-ether. The mother liquor of the above recrystallization is concentrated under reduced pressure, and the residue (280 mg.) thus obtained is methylated by methanol (5 ml.) and methanolic hydrochloric acid solution (10 ml.) and treated thereafter as usual. The crude crystals (300 mg.) thus obtained are chromatographed on 15 g. of Florisil to yield 78.3 mg. more of the same crystals as above.

dl - 17β - amino - 17α - methoxy - 3β - hydroxy - D-homo-5α-androstan-18-oic acid lactam, M.P. 229–231° C., prismatic crystals from methanol, acetone and ether.

IR: $\nu_{max.}^{CHCl_3}$ 3607 (OH), 3425 (NH), 1697 (CONH), 1032 (CO) cm.$^{-1}$.

Analysis.—Calcd. for $C_{21}H_{33}O_3N$ (347.48): C, 72.58, H, 9.57, N, 4.03. Found: C, 72.73, H, 9.72, N, 3.98.

dl - 17β - amino - 17α - methoxy - 3β - hydroxy - D-homo-5α-androstan-18-oic acid lactam (284 mg.) is acetylated with acetic anhydride in pyridine to afford quantitatively dl - 3β-acetoxy-17α-methoxy-17β-amino-D-homo-5α-androstan-18-oic acid lactam as needles or prisms, M.P. 260–262° C. (recrystallized from acetone-ether).

IR: $\nu_{max.}^{CHCl_3}$ 3475 (NH), 3300 (NH), 1724 (CH$_3$COO), 1710 (CONH), 1700 (CONH), 1253, 1025 (CH$_3$COO) cm.$^{-1}$.

Analysis.—Calcd. for $C_{23}H_{35}O_4N$ (389.52): C, 70.92, H, 9.06, N, 3.60. Found: C, 70.95, H, 9.10, N, 3.68.

A solution of 380 mg. of dl-3β-acetoxy-17α-methoxy-17β-amino-D-homo-5α-androstan-18-oic acid lactam dissolved in anhydrous toluene (60 ml.) is distilled to remove 10 ml. of the solvent, moisture present being expelled azeotropically. To this solution are added 48 mg. of sodium hydride and the mixture is refluxed for 0.5 hour in an atmosphere of nitrogen with stirring. Then, after a solution of methanesulfonyl chloride (230 mg.) in 10 ml. of anhydrous toluene is added dropwise in the course of 0.5 hour, the mixture is boiled for 2 hours. Adding water (15 ml.) carefully under ice-cooling, the separated organic layer is combined with another 3 chloroform extracts obtained by successive extraction from the water layer, washed with water, and dried over sodium sulfate. The solvent is distilled off and the residue (470 mg.) is acetylated with 3 ml. of acetic anhydride and 5 ml. of pyridine by standing for 1 night, and treated as usual to obtain crude acetate, 473 mg. which forms thin plates, M.P. 249–254° C. of dl-3β-acetoxy-17α - methoxy - 17β - amino-D-homo-5α-androstan-18-oic acid lactam N-methane-sulfonate from chloroform, acetone and ether. The mother liquor is concentrated under reduced pressure and the residue, 235 mg., is chromatographed on 8 g. of alumina and the additional crystals, 61.5 mg., are obtained from eluate of petroleum ether-benzene (4:6)-benzene. Total, 307.4 mg.

dl - 3β - acetoxy - 17α - methoxy - 17β - amino - D-homo-5α-androstan-18-oic acid lactam N-methane-sulfonate, thin long plates, M.P. 260–263° C., from acetone-ether.

IR: $\nu_{max.}^{CHCl_3}$ 1730 (CON, CH$_3$COO); 1356, 1169, 1155, 1141 (SO$_2$N); 1248, 1028 (CH$_3$COO) cm.$^{-1}$.

*Analysis.*—Calcd. for $C_{24}H_{37}O_6SN$ (467.54): C, 61.65, H, 7.98, N, 2.00, S, 6.86. Found: C, 61.45, H, 8.03, N, 2.91, S, 6.89.

The mixture of 30 mg. of dl-3β-acetoxy-17α-methoxy-17β-amino-D-homo-5α-androstan-18-oic acid lactam N-methanesulfonate, 100 mg. of sodium hydroxide, 3.3 ml. of dioxane and 0.65 ml. of water is refluxed in a stream of nitrogen for 1 hr. After cooling, the reaction mixture is neutralized with acetic acid, 150 mg., then added with water under cooling and acidified with hydrochloric acid, and the resultant crystals are extracted 3 times with chloroform. The extracts are combined, washed twice with water, dried over sodium sulfate, and evaporated. The residue, 23.2 mg., is recrystallized from acetone and ether to yield 16.8 mg. of dl-3β,17α,17β-trihydroxy-D-homo-5α-androstan-18-oic acid (18→17β) lactone (decomposed under 310° C.). This is a carboxylic acid but seems to form a hemiketal lactone structure in an equilibrium. In the crystal state, this seems to take the hemiketal lactone structure, as a result of IR determination. This compound shows no rise on repeated recrystallization. Leaflets from chloroform-acetone.

IR: $\nu_{max.}^{Nujol}$ 3540, 3265 (OH); 1733 (hemiketal lactone), 1710 (COOH, CO) cm.$^{-1}$.

*Analysis.*—Calcd. for $C_{20}H_{30}O_4$ (334.44): C, 71.82; H, 9.04. Found: C, 71.82; H, 9.14.

dl-3β,17α,17β-trihydroxy- D - homo-5α-androstan-18-oic acid (18→17β) lactone is methylated in conventional manner with an etheral solution of diazomethane dissolved in 6 ml. of dioxane to afford 91.8 mg. of crude product, which is recrystallized from acetone-ether to give 82.1 mg. of methyl dl-3β-hydroxy-17-oxo-D-homo-5α-androstan-18-oate, M.P. 186–187° C. The pure crystals of the product repeatedly recrystallized from acetone-ether are prisms, M.P. 193–194° C.

(IR: $\nu_{max.}^{Nujol}$ 3487 (OH), 1731 (ester), 1703 (CO), 1415 $CH_3CO$) cm.$^{-1}$.

*Analysis.*—Calcd. for $C_{21}H_{32}O_4$ (348.47): C, 72.38; H, 9.26. Found: C, 72.78; H, 9.32.

Thus obtained methyl dl-3β-hydroxy-17-oxo-D-homo-5α-androstan-18-oate is treated with benzoyl chloride in the presence of pyridine to give methyl dl-3β-benzoyloxy-17-oxo-D-homo-5α-androstan-18-oate. To a solution of the latter (430 mg.) in anhydrous tetrahydrofuran (20 ml.) is added dropwise another ether solution of Grignard reagent [prepared from $CH_3I$ (1.5 g.), Mg (231 mg.) and anhydrous ether (6 ml.)] with stirring at room temperature. The dropwise addition takes 5 hours. The mixture is stirred at the same temperature for 1 hr., and then refluxed for 1 hr. After chilling, water (5 ml.) and 2 N-hydrochloric acid (10 ml.) are added, and the mixture is extracted 3 times with chloroform. The extract is washed with 2 N-sodium carbonate solution and water, dried over sodium sulfate, and evaporated. To the residue (507.3 mg.) are added benzoyl chloride (730 mg.) and pyridine (5 ml.), and allowed to stand over night at room temperature. Thus obtained crude benzoyl compound (871.7 mg.) is chromatographed on alumina (Woelm II, neutral) (15 g.). From the eluates with petroleum ether-benzene (1:1–1:2) is obtained 3β-benzoyloxy-17α-methyl-17β-hydroxy-D-homo-5α-androstan-18-oic acid (18→17β) lactone (159.3 mg.) as fine needles, M.P. 246–248° C. (from acetone-ether). From the mother liquor are recovered 17.9 mg. of the product. Total yield: 177.2 mg.

IR: $\nu_{max.}^{Nujol}$ 3070 (aromatic ring), 1767 (lactone), 1717 (aromatic COOH), 1623, 1609, 1589, 1493, 718 (aromatic ring), 1282, 1124 (aromatic COOH) cm.$^{-1}$.

IR: $\nu_{max.}^{CHCl_3}$ 1763 (γ-lactone), 1712, 1280, 1122 (aromatic COOH) cm.$^{-1}$.

*Analysis.*—Calcd. for $C_{28}H_{36}O_4$ (436.57): C, 77.03; H, 8.31. Found: C, 77.07; H, 8.31.

The benzoyl compound (41 mg.), methanol (2.4 ml.), dioxane (2.5 ml.) and potassium hydroxide solution (61 mg. in 0.5 ml. water) are combined and refluxed for 3 hrs. under nitrogen current. Then the solution is acidified with conc. hydrochloric acid under ice-cooling, and extracted 3 times with chloroform. The extract is washed with 2 N-sodium carbonate solution and water, dried over sodium sulfate, and evaporated. The residue is recrystallized from acetone-ether to give 3β,17β-dihydroxy-17α-methyl-D-homo-5α-androstan-18-oic acid (18→17β) lactone (21.3 mg.) as plates, M.P. 225–226° C. From the mother liquor are obtained an additional 8.4 mg. of the product.

IR: $\nu_{max.}^{Nujol}$ 3530(OH), 1746 (lactone) cm.$^{-1}$.

*Analysis.*—Calcd. for $C_{21}H_{32}O_3$ (332.47): C, 75.86; H, 9.70. Found: C, 75.67; H, 9.63.

To a well-stirred and ice-cooled solution of 3β-benzoyloxy-17α-methyl-17β-hydroxy-D-homo-5α-androstan-18-oic acid (18→17β) lactone (148 mg.) in anhydrous tetrahydrofuran (10 ml.) is added a 0.248 M lithium aluminum hydride solution (in ether) (1.8 ml.) and the mixture is refluxed for 3 hrs. After cooling, 0.88 M potassium sodium tartrate (7 ml.) and 0.25 M tartaric acid (5 ml.) are added, and the mixture is extracted with chloroform. The extract is washed with water, dried over $Na_2SO_4$, and evaporated. The residue (134.4 mg.) is dissolved in triethyleneglycol (2.8 ml.), and potassium hydroxide (207 mg.) and 80% hydrazine hydrate (0.38 ml.) are added. The mixture is heated at 120–140° C. for 0.5 hr., and then at 210–220° C. for 2.5 hrs.

After cooling, the mixture is poured into ice-water and extracted with chloroform. The extract is washed with water, 2 N-hydrochloric acid, 2 N-sodium carbonate and water in turn, dried over $Na_2SO_4$ and evaporated. The residue (106.3 mg.) is chromatographed on alumina (Welm II, Neutral) (4 g.). The eluates with benzene-chloroform (1:2)-chloroform are recrystallized from acetone to afford dl-17α-methyl-D-homo-5α-androstan-3β,17-diol (6 mg.) as needles, M.P. 224–228° C.

Acetylation gives dl-3β-acetoxy-17α-methyl-D-homo-5α-androstan-17-ol as prisms, M.P. 142–144/162–163° C. (recrystallized from acetone-ether).

IR (Chloroform): 3625, 3505, 1726, 1249, 1025 cm.$^{-1}$.

*Analysis.*—Calcd. for $C_{23}H_{38}O_3$: C, 76.19; H, 10.57. Found: C, 76.22; H, 10.60.

Then the eluates with chloroform-methanol (99:1–95:5) are recrystallized from chloroform-methanol-acetone to afford dl-17α-methyl-D-homo-5α-androstane-3β,17,18-triol (50.3 mg.) as plates, M.P. 273–278° C.

IR (Nujol): 3485, 3435, 3315, 1040 cm.$^{-1}$.

*Analysis.*—Calcd. for $C_{21}H_{36}O_3$: C, 74.95; H, 10.78. Found: C, 74.74; H, 10.68.

(B):—

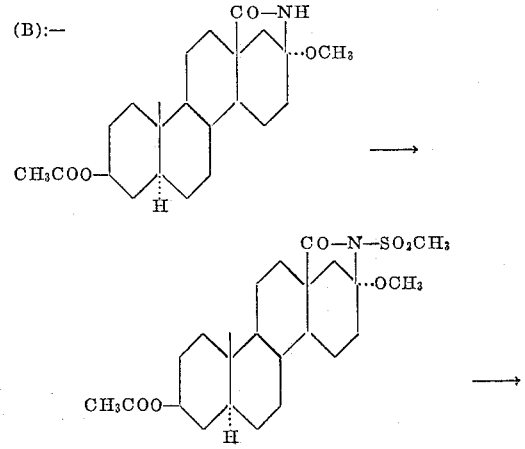

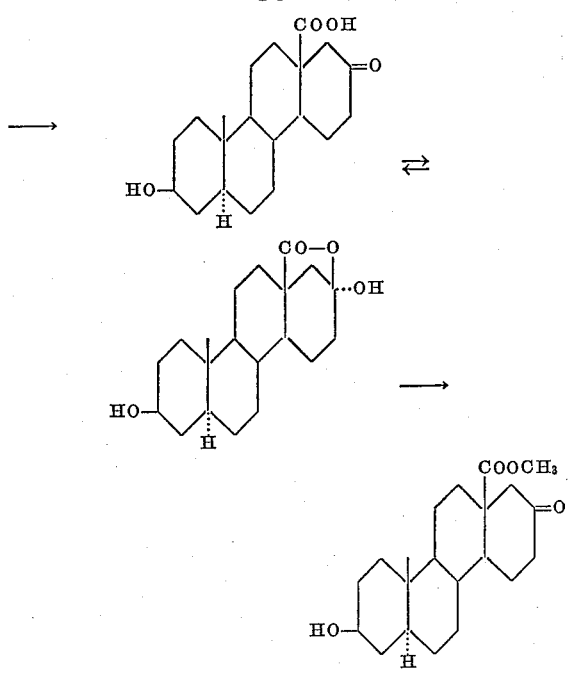
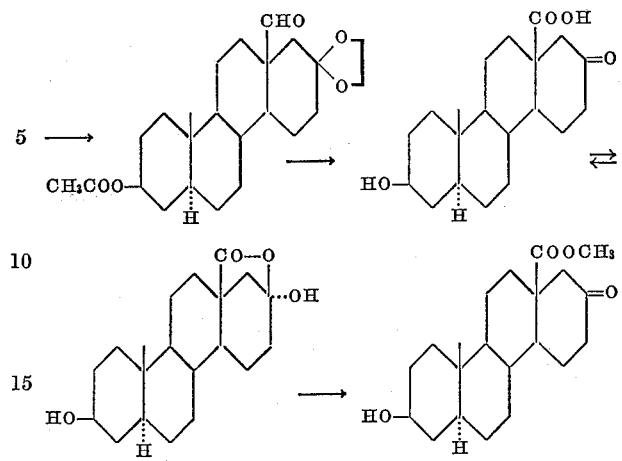

dl-3β-acetoxy-17α-methoxy-17β-amino-D-homo-5α-androstan-18-oic acid lactam (312.4 mg.) is dissolved in 60 ml. of a mixture of toluene and xylene (1:1), and 185 mg. of methanesulfonyl chloride and 38 mg. of sodium hydride then added. The resultant mixture is refluxed for 2 hours. Adding water (20 ml.) carefully under ice-cooling, the organic layer is combined with another 3 chloroform extracts obtained by subsequent extraction from the water layer, washed with water, and dried over sodium sulfate. After removal of the solvent, the resulting crude product is recrystallized from acetone-ether to afford 201.8 mg. of dl-3β-acetoxy-17α-methoxy-17β-ammo-D-homo-5α-androstan-18-oic acid lactam N-methanesulfonate as crystals, M.P. 251–258° C. From the mother liquor, 67.5 mg. more of the product are recovered by the same treatment. Totally, 269.3 mg. of the product are obtained. To the thus obtained dl-3β-acetoxy-17α-methoxy-17β-amino-D-homo-5α-androstan-18-oic acid lactam N-methanesulfonate (1.45 g.), 4.5 g. of sodium hydroxide, 150 ml. of dioxane and 29 ml. of water are added and the mixture then boiled for 3 hrs. in a stream of nitrogen. After being cooled, the mixture is neutralized with 5.4 g. of acetic acid, and extracted 3 times with chloroform. The combined extract is washed twice with 2 N-sodium hydroxide and then twice with water, dried over sodium sulfate, distilled to remove the solvent, the residue recrystallized from acetone-ether to recover 253 mg. of the starting material, M.P. 242–250° C. The above 2 N-sodium hydroxide washings are combined, acidified to Congo grey with concentrated hydrochloric acid under cooling, and the crystals thereby separated are extracted 6 times with chloroform-methanol (9:1). The combined extracts are washed with water, dried over sodium sulfate, distilled to remove the solvent, 863 mg. of residue remaining. The residue is dissolved immediately in dioxane and methylated with diazomethane. The crude ester is recrystallized from acetone-ether to give pure methyl dl-3β-hydroxy-17-oxo-D-homo-5α-androstan-18-oate (777.8 mg.).

(C):

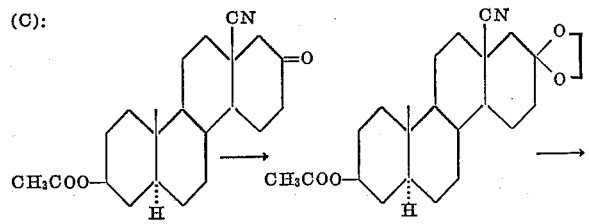

A solution of 160 mg. of dl-3β-acetoxy-13β-cyano-D-homo-5α-androstan-17-one ethylene ketal, which is obtained by ketalation of dl-3β-acetoxy-13β-cyano-D-homo-5α-androstan-17-one with ethylene glycol, in 8 ml. of tetrahydrofuran is stirred dropwise with external ice-cooling and in the course of 5 minutes into a solution of lithium aluminum diethoxyhydride in tetrahydrofuran, prepared from 15.5 ml. of 0.312 M-lithium aluminum hydride solution in tetrahydrofuran and 350 mg. of ethyl acetate. The mixture is stirred for 30 minutes under ice-cooling and then 3.5 hours at room temperature, cooled, and 4 ml. of 0.886 M-sodium potassium tartrate solution and 0.36 ml. of 0.5 M-tartaric acid solution added. The reaction mixture is extracted 3 times with chloroform. The combined extract is washed with water, dried, and distilled under reduced pressure to give 214 mg. of residue. This corresponds to a mixture of an iminomethyl compound and a small quantity of an aldehyde and the starting cyano compound, as interpreted by IR determination, thus shows absorption at 3508 and 3458 corresponding to OH, 3258 and 1635 corresponding to —CH=NH group, 2218 corresponding to CN, and 2700 and 1716 cm.$^{-1}$ corresponding to CHO group. The residue is dissolved in 9 ml. of methanol, and after addition of 1 ml. of 2 N-sodium hydroxide, refluxed for 5 minutes. After neutralization with acetic acid, the reaction mixture is extracted 3 times with chloroform. The combined extract is washed with water, dried, solvent distilled off under reduced pressure, and is subjected to acetylation with 3 ml. of acetic anhydride and 5 ml. of anhydrous pyridine at room temperature for 1 night. The crude product, 224 mg., is chromatographed on alumina (Welm III, neutral). From the fraction of petroleum ether-benzene (4:1–7:3) 34.8 mg. of dl-3β-acetoxy-17-oxo-D-homo-5α-androstan-18-al 17-ethylene ketal, M.P. 172–179° C. (with foaming), is obtained after recrystallization from acetone-ether.

IR: $\nu_{max.}^{Nujol}$ 2742 (CHO), 2680 (CHO), 1726 (CH$_3$COO, CHO), 1708 (CHO); 1122, 1099 (ethylene ketal); 1247 1022 (CH$_3$COO) cm.$^{-1}$.

Analysis.—Calcd. for C$_{24}$H$_{36}$O$_5$ (404.53): C, 71.25; H, 8.91. Found: C, 71.00, H, 8.92.

The second fraction of petroleum ether-benzene (3:2–3:7) gives 62 mg. of the starting material, M.P. 230–237° C., after recrystallization from acetone-ether.

Eighty mg. of dl-3β-acetoxy-17-oxo-D-homo-5α-androstan-18-al 17-ethylene ketal are dissolved in 15 ml. of acetone, freshly distilled after treatment with potassium permanganate, and added dropwise with 0.5 ml. of 8 N-chromic-sulfuric acid mixture (J. Chem. Soc., 1953, 2548) with stirring. The further stirring is continued for 20 minutes. Then, the reaction mixture has added thereto 5 drops of methanol and 50 ml. of water and is extracted 3 times with chloroform. The extracts are combined, washed with water, and dried over sodium sulfate. After removing the solvent, the residue (119 mg.) is dissolved in 10 ml. of acetone, 2 N-hydrochloric acid (2 ml.) added and the mixture boiled for 30 minutes. After the addition of anhydrous sodium acetate (300 mg.), the mixture (124.3 mg.) is dissolved in 1 ml. of N-sodium carbonate and 10 ml. of methanol and boiled for 1.5 hrs. After removing methanol by distillation, water is added to the residual solution, which is extracted 3 times with chloroform. The chloroform solution is extracted twice with 2 N-sodium hydroxide. The combined alkaline extracts are adjusted to pH 3 by the addition of concentrated hydrochloric acid under cooling, and extracted with chloroform. The extracts are washed with water, dried and distilled to give 37 mg. of crude crystals of dl-3β-hydroxy - 17 - oxo - D - homo - 5α - androstan - 18 - oic acid. This equilibrates with the hemiketal lactone form. This forms leaflet crystals of M.P. 310° C. (with decomposition) by recrystallization from chloroform-acetone.

IR: $\nu_{max}^{CHCl_3}$ 3540, 3265, (OH); 1733 (hemiketal lactone), 1710 (COOH, CO) cm.$^{-1}$.

Analysis.—Calcd. for $C_{20}H_{30}O_4$ (334.44): C, 71.82, H, 9.04. Found: C, 71.82, H, 9.14.

Thus obtained dl-3β-hydroxy-17-oxo-D-homo-5α-androstan-18-oic acid (37 mg.) is esterified by etheral solution of diazomethane in dioxane and treated as usual to obtain crude methyl ester (36.8 mg.). Further recrystallization from acetone-ether gives pure prismatic crystals of methyl dl - 3β - hydroxy - 17 - oxo - D - homo - 5α - androstan-18-oate, M.P. 193–194° C.

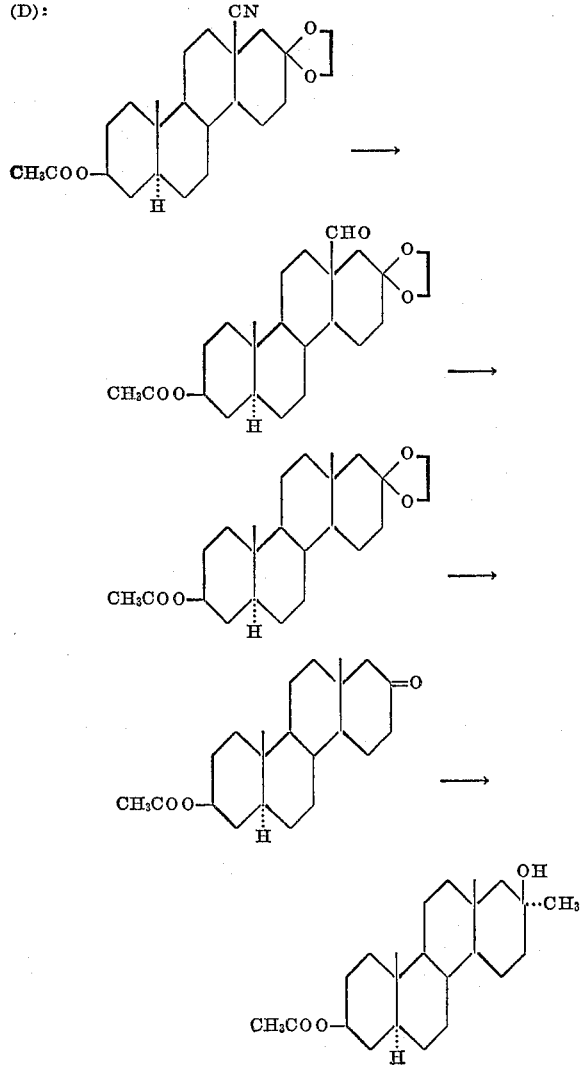

A solution of 138.5 mg. of dl-3β-acetoxy-13β-cyano-D-homo-5α-androstan-17-one ethylene ketal in 10 ml. of tetrahydrofuran is added to 20 ml. of 0.172 M-lithium aluminum hydride solution in tetrahydrofuran under ice-cooling and stirring in the course of 30 minutes and the stirring is continued at room temperature for 3 more hours. The reaction mixture is cooled, 10 ml. of water added, and then refluxed for 8 minutes to hydrolyze the imino compound. After concentration to a half volume under reduced pressure, the reaction mixture is neutralized by acetic acid and extracted 3 times with chloroform. The chloroform solution is washed with water, dried and distilled to remove the solvent. To the residue (142.4 mg.) is added 1.5 ml. of acetic anhydride and 2.5 ml. of pyridine and the whole allowed to stand overnight at room temperature. The crude acetylated product obtained in conventional manner from the above reaction mixture, 160 mg., is chromatographed on 8 g. of alumina (Welm III, neutral). From the fraction of petroleum ether-benzene (9:1–2:1), 50.3 mg. of dl-3β-acetoxy-17-oxo-D-homo-5α-androstan-18-al 17-ethylene ketal are obtained as crystals, M.P. 170–179° C., after recrystallization with acetone-ether. By further recrystallization, the mother liquor gives 20.4 mg. more of the crystals.

Thus obtained dl-3β-acetoxy-17-oxo-D-homo-5α-androstan-18-aldehyde 17-ethylene ketal (60 mg.) is admixed with potassium hydroxide (106 mg.), 80% hydrazine hydrate (0.3 ml.) and triethyleneglycol (2 ml.) and heated at 130–135° C. for 1 hr. The reaction temperature is gradually elevated. During the elevation, excess of hydrazine hydrate and water are distilled off. Then, the mixture is heated at 210–220° C. for 3 hrs. After cooling, the mixture is poured into ice-water and extracted with chloroform. The extract is washed with water, dried and evaporated to dryness. The residue (65.9 mg.) is recrystallized from ethanol to give dl-3β-hydroxy-D-homo-5α-androstan-17-one ethylene ketal (34.8 mg.), as plates, M.P. 221–223° C.

IR (Nujol): 3602, 3551, 1102, 1075 cm.$^{-1}$.

Analysis.—Calcd. for $C_{22}H_{36}O_3$ (348.51): C, 75.81; H, 10.41. Found: C, 75.71; H, 10.38.

Acetylation of dl-3β-hydroxy-D-homo-5α-androstan-17-one ethyleneketal gives dl-3β-acetoxy-D-homo-5α-androstan-17-one ethyleneketal, M.P. 164–166/173–174° C.

IR (Nujol): 1731, 1241, 1028, 1020, 1102, 1078 cm.$^{-1}$.
Analysis.—Calcd. for $C_{24}H_{38}O_4$ (390.54): C, 73.80; H, 9.81. Found: C, 73.76; H, 9.80.

Deketalization of dl-3β-acetoxy-D-homo-5α-androstan-17-one ethyleneketal gives dl-3β-acetoxy-D-homo-5α-androstan-17-one, M.P. 160–163° C.

IR (Nujol): 1739, 1711, 1248, 1239, 1028 cm.$^{-1}$.
Analysis.—Calcd. for $C_{22}H_{34}O_3$ (346.49): C, 76.26; H, 9.89. Found: C, 76.30; H, 9.77.

To an ether solution of Grignard reagent which is prepared from methyl iodide (2.07 g.) and magnesium (356 mg.) in anhydrous ether (14 ml.) is added dropwise another solution of dl-3β-acetoxy-D-homo-5α-androstan-17-one (513.7 mg.) in anhydrous benzene (15 ml.) with stirring under ice-cooling. The dropwise addition takes 20 mins. The mixture is stirred for 1 hr. at room temperature and ether is distilled off. After addition of anhydrous benzene (30 ml.), the mixture is refluxed for 2.5 hrs. Then the mixture is ice-cooled, N-hydrochloric acid (20 ml.) is added and the mixture is extracted 5 times with chloroform-methanol (3:1). The extract is washed twice with a half-saturated aqueous solution of sodium sulfate, dried over anhydrous sodium sulfate, and evaporated. To the residue (623.9 mg.) are added acetic anhydride (4 ml.) and dry pyridine (5 ml.) and allowed to stand overnight at room temperature. Thus obtained crude acetate (671.6 mg.) is recrystallized from acetone-ether to give 17α-methyl-D-homo-androstan-3β,17β-diol-3β-acetate (291.1 mg.) as prisms, M.P. 142–144/162–163° C. (it melts once at 142–144° C., then solidifies and melts again at 162–

163° C.). Then, 151.2 mg. more of the product are obtained from the mother liquor. Totally, 442.3 mg. of 17α - methyl - D - homo - 5α - androstan - 3β,17β - diol 3-acetate are obtained.

IR: $\nu_{max.}^{CHCl_3}$ 3625, 3505 (OH), 1726, 1249, 1025 (CH₃COO) cm.⁻¹.

*Analysis.*—Calcd. for C₂₃H₃₈O₃ (362.53): C, 76.19; H, 1057. Found: C, 76.22; H, 10.60.

The configuration of the methyl radical in the 17-position is confirmed synthetically.

(E)

(D):—

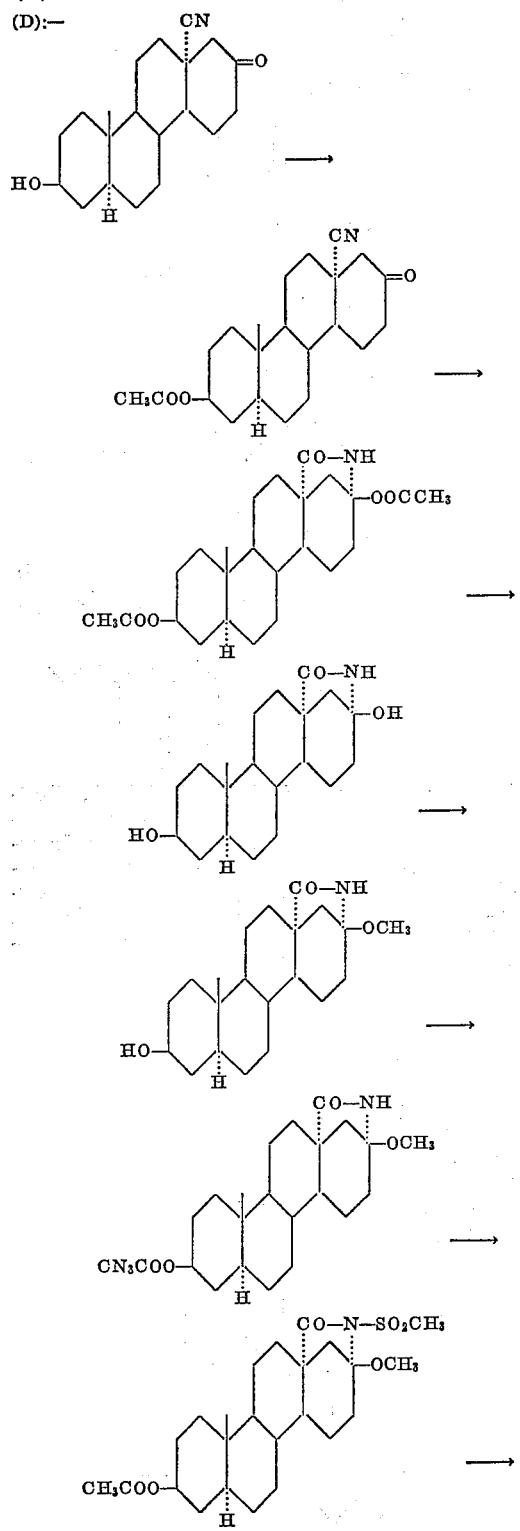

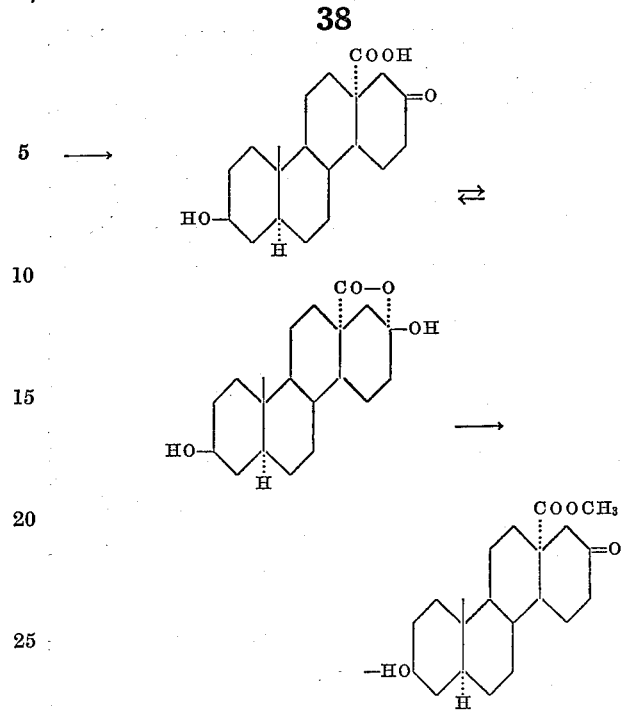

In the same manner as in Example III(A), dl-3-β-hydroxy-13α-cyano-D-homo-5α-androstan-17-one is converted through dl-3β-acetoxy-13α-cyano-D-homo-5α-androstan-17-one and dl-3β,17β-diacetoxy-17α-amino-D-homo-5α,13α-androstan-18-oic acid lactam into dl-3β,17β-dihydroxy - 17α - amino - D - homo - 5α,13α - androstan-18-oic acid lactam.

To a solution of 428 mg. of crude dl-3β,17β-dihydroxy-17α-amino-D-homo-5α,13α-androstan-18-oic acid lactam in 8 g. of dried methanol there are added 14 g. of 48% by weight) methanolic hydrochloric acid and the mixture is allowed to stand for 1 night at room temperature. After removing methanol at a reduced pressure, the residue is treated with water and extracted with chloroform-methanol (4:1) for 3 times. The extracts are combined, washed with 2 N-sodium carbonate and then water, dried over sodium sulfate, the solvent distilled to give 451 mg. of the crude product. This is recrystallized from chloroform-methanol to give dl-3β-hydroxy-17β-methoxy - 17α - amino - D - homo - 5α,13α - androstan-18-oic acid lactam as small prisms of M.P. 297–299° C. (172 mg.). Additional crystals 49.1 mg., are obtained by further treatment of mother liquor.

dl - 3β - hydroxy - 17β - methoxy - 17α-amino - D - homo-5α,13α-androstan-18-oic acid lactam.

IR: $\nu_{max.}^{CHCl_3}$ 3615 (OH), 3425 (NH), 1703 (CONH) cm.⁻¹.

*Analysis.*—Calcd. for C₂₁H₃₃O₃N (347.48): C, 75.28, H, 59.57; N, 4.03. Found: C, 72.31; H, 9.39; N, 4.24.

Thus obtained methyl ether, 122 mg., is acetylated by allowing it to stand with 6 ml. of acetic anhydride and 9 ml. of pyridiene at room temperature overnight. Crude acetate thereby obtained, 171 mg., is recrystallized from acetone-ether to give 102.5 mg. of 3β-acetoxy-17β-methoxy-17α-amino-D-homo-5α,13α-androstan-18-oic acid lactam as prisms, M.P. 224–225° C. Additional product (13.0 mg.) is recovered from mother liquor.

The product is purified by further recrystallization from acetone-ether to give prisms, M.P. 237–240° C.

IR: $\nu_{max.}^{CHCl_3}$ 3424, 3241, (NH); 1727 (CH₃CO), 1708 (CONH); 1252, 1028 (CH₃CO) cm.⁻¹.

*Analysis.*—Calcd. for C₂₃H₃₅O₄N (389.52): C, 70.92; H, 9.06; N, 3.60. Found: C, 70.88; H, 9.05; N, 3.63.

3β - acetoxy - 17β - methoxy - 17α - amino - D - homo-5α,13α-androstan-18-oic acid lactam, 275 mg., is dissolved in 55 ml. of dry xylene, dehydrated azeotropically, mixed with 40 mg. of sodium hydride, and then boiled for 1 hr. in a stream of nitrogen under stirring. To the reaction mixture is adde a solution of 190 mg. of methanesulfonyl chloride in 10 ml. of dry xylene and further refluxed for 3 hrs. After cooling, the resulting mixture is added with water and extracted with chloroform. After drying, the solvent is distilled off. The residue, 329 mg., is acetylated with 3 ml. of acetic anhydride and 5 ml. of pyridine at room temperature by allowing to stand over night. The crude acetate, 319 mg., obtained in conventional manner, is chromatographed on 9 g. of alumina, eluted with petroleum ether-benzene (6:4)-benzene-chloroform (7:3) and the product from the eluates recrystallized from acetone-ether to give 159 mg. of 3β-acetoxy-17β-methoxy-17α-amino-D-homo-5α,13α-androstan-18-oic acid lactam N-methanesulfonate as crystals, M.P. 206–212° C. Further, 40.2 mg. of 3β-acetoxy-17β-methoxy-17α-amino-D-homo-5α, 13α-androstan-18-oic lactam is recovered by elution with benzene-chloroform (4:6).

3β - acetoxy - 17β - methoxy - 17α - amino - D - homo-5α,13α-androstan-18-oic acid lactam N-methanesulfonate, cubic crystals from acetone-ether, M.P. 206–212° C.

IR: $\nu_{max.}^{CHCl_3}$ 1730 (CON, CH$_3$COO); 1360, 1173 (SO$_2$N); 1261, 1028 (CH$_3$COO) cm.$^{-1}$.

Analysis.—Calcd. for $C_{24}H_{37}O_6SN$ (467.54); C, 61.63; H, 7.98; N, 3.00; S, 6.86. Found: C, 61.82; H, 8.13; N, 3.20; S, 6.61.

The mixture of 120 mg. of the mesylate, 10 ml. of dioxane, 400 mg. of sodium hydroxide and 2.5 ml. of water is refluxed for 1 hr. in a stream of nitrogen. The reaction mixture is cooled, neutralized with 0.5 ml. of acetic acid, concentrated under reduced pressure, acidified with concentrated hydrochloric acid to Congo grey and extracted 3 times with chloroform. The combined extract is washed with water, dried over sodium sulfate and distilled to remove the solvent to give the crude crystals, which are recrystallized from chloroform-acetone-ether to obtain 76.7 mg. of dl-3β-hydroxy-17-oxo-D-homo-5α, 13α-androstan-18-oic acid as prisms, M.P. 250–254° C. The additional crystals, 0.9 mg., are obtained from the mother liquor. Total yield is 77.6 mg. of dl-3β-hydroxy-17-oxo-D-homo-5α,13α-androstan-18-oic acid, M.P. 251–255° C./300° C. (with decomposition) from chloroform-acetone-ether.

IR: $\nu_{max.}^{Nujol}$ 3525 (OH), 2500–2700 (COOH); 1711 (CO); 1691 (COOH) cm.$^{-1}$.

Analysis.—Calcd. for $C_{20}H_{30}O_4$ (334.44): C, 71.82; H, 9.04. Found: C, 71.46; H, 9.07.

The carboxylic acid obtained above, 43.7 mg. is methylated with diazomethane in conventional manner and the resulting crude ester, 44.1 mg. is recrystallized from acetone-ether to give 36.7 mg. of methyl dl-3β-hydroxy-17-oxo-D-homo-5α,13α-androstan-18-oate as prisms, M.P. 154–158° C.

Methyl dl - 3β-hydroxy-17-oxo-D-homo-5α,13α-androstan-18-oate prisms, M.P. 164–167° C., from acetone-ether.

IR: $\nu_{max.}^{CHCl_3}$ 3629 (OH), 1728 (ester), 1710 (CO), 1142 (ester) cm.$^{-1}$.

Analysis.—Calcd. for $C_{21}H_{32}O_4$ (348.47); C, 72.38; H, 9.26. Found: C, 72.06; H, 9.29.

(F): 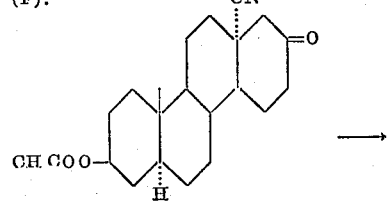

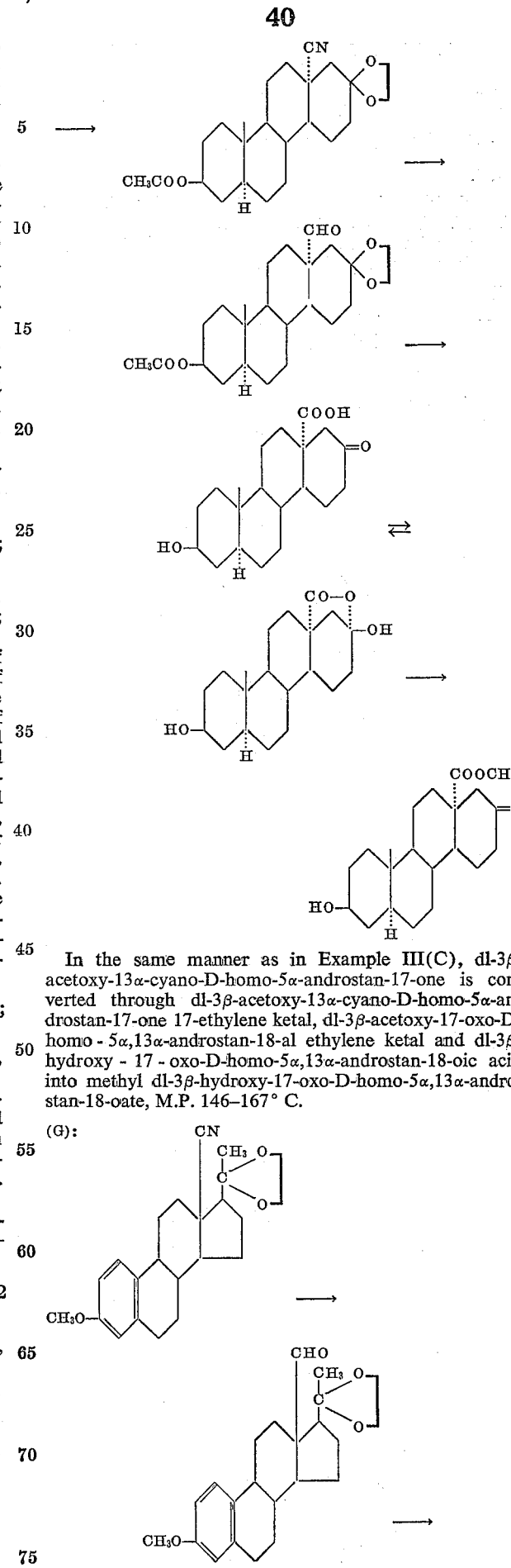

In the same manner as in Example III(C), dl-3β-acetoxy-13α-cyano-D-homo-5α-androstan-17-one is converted through dl-3β-acetoxy-13α-cyano-D-homo-5α-androstan-17-one 17-ethylene ketal, dl-3β-acetoxy-17-oxo-D-homo - 5α,13α-androstan-18-al ethylene ketal and dl-3β-hydroxy - 17 - oxo-D-homo-5α,13α-androstan-18-oic acid into methyl dl-3β-hydroxy-17-oxo-D-homo-5α,13α-androstan-18-oate, M.P. 146–167° C.

(G):

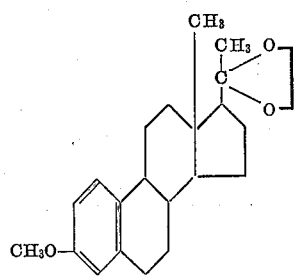

To a solution of 286 mg. of dl-3-methoxy-20-oxo-13β-cyano-19-nor-pregna-1,3,5(10)-triene 20-ethylene ketal in tetrahydrofuran (15 ml.) is added a solution of lithium aluminum hydride (290 mg.) in tetrahydrofuran (55 ml.) dropwise at room temperature with stirring. The reaction temperature is raised gradually by gentle heating and then refluxed for 4 hrs. After addition of a solution (2 ml.) of potassium sodium tartrate and a solution (1 ml.) of tartaric acid under ice-cooling, the upper organic layer is decanted and lower water layer is extracted 3 times with chloroform. The combined organic layer is washed with water, dried and the solvent distilled to give an oily substance (297.6 mg.). A small quantity of the produce is recrystallized from acetone-ether to obtain crystals of dl - 3 - methoxy-18-imino-19-nor-pregna-1,3,5 (10)-trien-20-one ethylene ketal, M.P. 147–151° C.

IR: $\nu_{max.}^{CHCl_3}$ 1633 (NH) cm.$^{-1}$

Analysis.—Calcd. for $C_{23}H_{31}O_3N$ (369.49): C, 74.76; H, 8.46. Found: C, 75.12; H, 8.39.

The remainder (282 mg.) of the above crystals is dissolved in 27 ml. of methanol and 3 ml. of 2 N-sodium hydroxide, and refluxed for 10 mins. in an atmosphere of nitrogen. After removal of the solvent by distillation, the mixture is diluted with water and then extracted 3 times with chloroform. Extracts are combined and washed with water, dried, and distilled to remove the solvent, whereby an oily substance (281 mg.) is obtained. This product is chromatographed on 15 g. of alumina (Welm, neutral) and 3-methoxy-20-oxo-19-nor-pregna-1, 3,5(10)-trien-18-al 20-ethylene ketal (135.4 mg.) is obtained from the eluate by petroleum ether-benzene (1:1)-benzene after recrystallization with acetone-ether, M.P. 157–162° C.

IR: $\nu_{max.}^{CHCl_3}$ 1712 (CHO) cm.$^{-1}$

Analysis.—Calcd. for $C_{23}H_{30}O_4$ (370.47): C, 74.56; H, 8.16. Found: C, 74.56; H, 8.04.

The following eluate by the solvents of benzene-benzene-chloroform (4:1) systems gives 27.7 mg. of the 18-imino compound identical to the above-obtained sample.

A mixture of dl-3-methoxy-20-oxo-19-nor-pregna-1,3,5(10)-trien-18-aldehyde ethylene ketal (84.1 mg.), potassium hydroxide (155 mg.), hydrazine hydrate (0.5 ml.) and triethyleneglycol (3 ml.) is heated at 140–143° C. for 0.5 hr., and at 210–220° C. for 4.5 hrs. After cooling, the reaction mixture is poured into ice-water, and extracted with chloroform. The extract is washed with water, dried and evaporated. The residue (93 mg.) is recrystallized from acetone-ether to yield dl-3-hydroxy-19-nor - pregna - 1,3,5(10)-trien-20-one-ethyleneketal (23.3 mg.) as needles, M.P. 203–207° C.

IR (Nujol): 3615 cm.$^{-1}$.

Analysis.—Calcd. for $C_{22}H_{30}O_3$ (342.46): C, 77.15; H, 8.44. Found: C, 77.22; H, 8.80.

The mother liquor is evaporated and the residue (68.5 mg.) is chromatographed on alumina (Welm, neutral) (4 g.). The eluates with petroleum ether-benzene (2:1–1:1) give dl-3-methoxy-19-nor-pregna-1,3,5(10)-triene-20-one ethyleneketal (4.8 mg). Columns, M.P. 103–105° C. (recrystallized from ether-pentane).

Analysis.—Calcd. for $C_{23}H_{32}O_3$ (250.49): C, 77.49, H, 9.05. Found: C, 77.64; H, 9.09.

Then the eluates with benzene-chloroform (2:1–1:1) give 23.3 mg. more of dl-3-hydroxy-19-nor-pregna-1,3,5 (10)-trien-20-one ethyleneketal, of which total yield is 46.6 mg.

Thus obtained dl-3-methoxy-19-nor-pregna-1,3,5(10)-trien-20-one ethylene ketal is useful as a starting compound in the synthesis of estrone as shown in the following scheme:

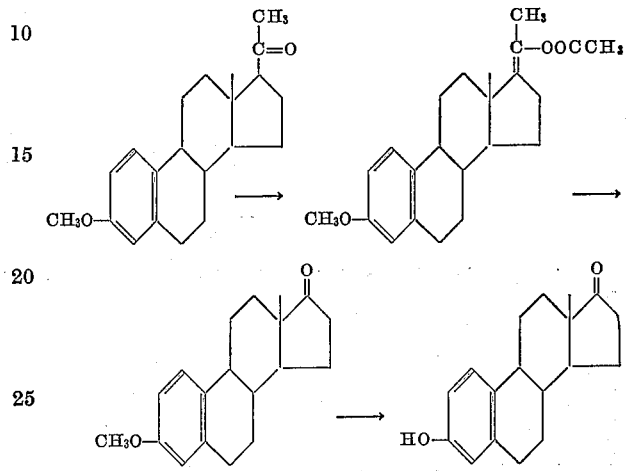

That is to say, dl-3-methoxy-19-nor-pregna-1,3,5(10)-trien-20-one, prepared from the said ethylene ketal by the conventional deketalation method, is treated with acetic anhydride and p-toluenesulfonic acid to give the enol acetate, which is ozonized to dl-estrone methyl ether (C. W. Marshall et al.: J.A.C.S., 70, 1837 (1948)), and the latter is easily hydrolyzed to dl-estrone.

*Example IV*

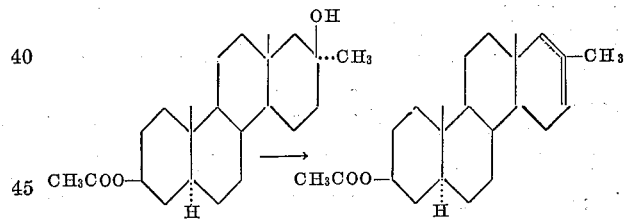

dl - 17α-methyl - D-homo-5α-androstan 3β-diol 3-acetate (540 mg.) is dissolved in dry pyridine (4 ml.). To the solution is added dropwise phosphorus chloride (0.5 ml.) with agitation under cooling. Then, the mixture is heated at 60–65° C. for 40 mins. Working up as usual, the crude crystals obtained are recrystallized from ethanol to give 437.6 mg. of crystals melting at 119–120° C. From the mother liquor there are obtained 13.2 mg. more of the product. Totally, 450.8 mg. of the product are yielded. This product is a tautomeric mixture of dl-17-methyl-D-homo-5α-androst-16-en-3β-ol acetate and dl-17-methyl-D-homo-5α-androst-17-en-3β-ol acetate.

IR: $\nu_{max.}^{Nujol}$ 1729, 1260, 1238, 1043, 1038 ($CH_3COO$), 831 (double bond) cm.$^{-1}$.

Analysis.—Calcd. for $C_{23}H_{36}O_2$: C, 80.18; H, 10.53. Found: C, 80.42; H, 10.44.

*Example V*

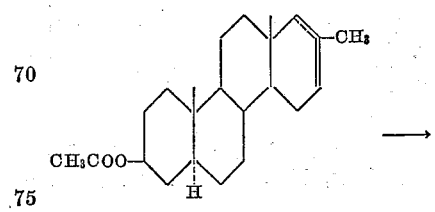

43

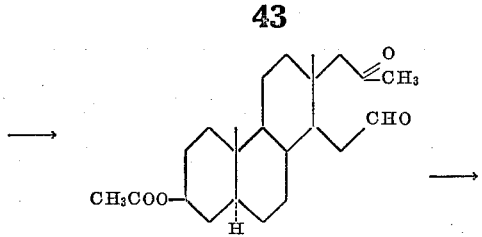

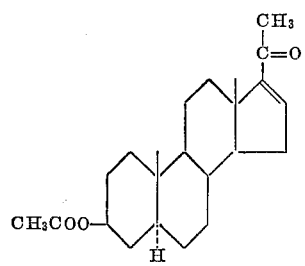

A tautomeric mixture (50 mg.) of dl-17-methyl-D-homo-5α-androst-16-en-3β-ol acetate and dl-17-methyl-D-homo-5-α-androst-17-en-3β-ol acetate is dissolved in chloroform (7 ml.) and anhydrous methanol (3 ml.) and the solution is cooled to —80° C. with acetone-Dry Ice. Then 150 ml. of oxygen-ozone (ozone is contained at a ratio of 3.18% (v./v.)) are introduced at the velocity of 50–60 ml./min., and the whole allowed to stand for 20 mins. Then glacial acetic acid (0.1 ml.) and zinc dust (100 mg.) are added to decompose the ozonide, and the zinc dust is filtered off. The filtrate is concentrated in vacuo, water is added, and the mixture is extracted 3 times with chloroform. The extract is washed with sodium bicarbonate solution and water, and dried. Upon removing the solvent, there is obtained a mixture (70 mg.) of dl-3β-acetoxy-16-acetyl-16,17-seco-5α-androstan-17-aldehyde and dl-3β-acetoxy17-acetyl-16,17-seco-5α-androstan-16-aldehyde. Although the mixture may be treated in the following process without separation, it can be also separated by chromatography.

Characteristics of each component are the following:

dl-3β-acetoxy-17-acetyl - 16,17 - seco-5α-androstan-16-aldehyde (Dl-3β-acetoxy - 20 - oxo-16,17-seco-5α-pregnan-16-aldehyde):

Needles, M.P. 112–115° C. (from ether-pentane).

IR: $\nu_{max}^{CHCl_3}$ 2711 (CHO), 1725 ($CH_3COO$, CHO), 1714 (CO), 1245, 1029 ($CH_3COO$) cm.$^{-1}$.

Analysis.—Calcd. for $C_{23}H_{36}O_4$ (376.52): C. 73.36; H, 9.64. Found: C, 73.42; H, 9.62.

dl-3β-Acetoxy-16-acetyl - 16,17 - seco-5α-androstan-17-aldehyde:

Prisms, M.P. 118.5–120° C. (from ether-pentane).

IR: $\nu_{max}^{CHCl_3}$ 2697 (CHO), 1722, ($CH_3COO$, CHO, CO), 1248, 1028 ($CH_3COO$) cm$^{-1}$.

Analysis.—Calcd. for $C_{23}H_{36}O_4$ (376.52): C. 73.36; H, 9.64. Found: C, 73.27; H, 9.55.

A mixture (70 mg.) of dl-3β-acetoxy-16-acetyl-16,17-seco-5α-androstan - 17 - aldehyde and dl-3β-acetoxy-17-acetyl-16,17-seco-5α-androstan-16-aldehyde is dissolved in dry xylene (1 ml.), and a solution of triethylamine (0.6 ml.) and glacial acetic acid (0.36 ml.) in dry xylene (10 ml.) is added. The mixture is placed in a glass-tube, cooled to —85° C., and sealed under reduced pressure (1 torr). The tube is heated for 10 hrs. in a xylene bath. After chilling, the reaction mixture is treated with 2 N-hydrochloric acid and water, and the aqueous layer is extracted with ether. The organic layers are combined, washed with water, dried, and evaporated. The oily residue (47.3 mg.) is chromatographed on alumina (Woelm II) (2 g.). From the fraction of petroleum ether-benzene (9:1–8:2) is obtained dl-3β-acetoxy-5α-pregn-16-en-20-one as plates, M.P. 158–164° C. (from methanol) (2.3 mg.), which is identified with the compound transformed from natural steroid.

IR: $\nu_{max}^{CS_2}$ 3067 (double bond), 1735 ($CH_3COO$), 1670 (α,β-unsaturated ketone), 1238, 1026 ($CH_3COO$), 819 (double bond) cm.$^{-1}$.

UV: $\lambda_{max}^{EtOH}$ 240.5 mμ (ε: 9110)

Analysis.—Calcd. for $C_{23}H_{34}O_3$ (358.50): C, 77.05; H, 9.56. Found: C, 77.17; H, 9.50.

Then eluates with petroleum ether-benzene (7:3–3:7) are recrystallized from ether-pentane to give dl-3β-acetoxy-16-acetyl-5α-androst-16(17)-ene (10.3 mg.), as plates, M.P. 162–165° C.

IR: $\nu_{max}^{CS_2}$ 3050 (double bond), 1735 ($CH_3COO$), 1670 (α,β-unsaturated ketone), 1238, 1025 ($CH_3COO$), 849 (double bond) cm.$^{-1}$.

UV: $\lambda_{max}^{EtOH}$ 241.5 mμ (ε: 11500)

Analysis.—Calcd. for $C_{23}H_{34}O_3$ (358.50): C, 77.05; H, 9.56. Found: C, 76.93; H, 9.53.

It is to be understood that the invention is not to be limited to the exact details of operation or exact compounds shown and described, it being intended to limit the invention only by the scope of the appended claims.

What is claimed is:

1. A compound of the formula:

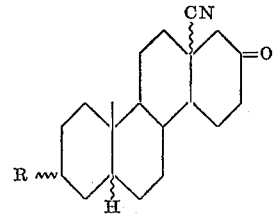

wherein R represents a radical selected from the group consisting of oxo and ethylenedioxy, when R is divalent, hydroxy, acetoxy and benzoyloxy, when R is monovalent, and the ripple mark ($) represents a position selected from the group consisting of α-position and β-position.

2. A compound of the formula:

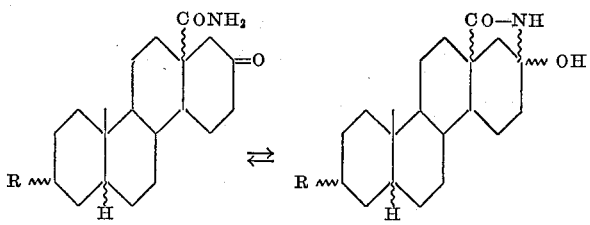

wherein R represents a radical selected from the group consisting of oxo and ethylenedioxy, when R is divalent, hydroxy, acetoxy and benzoyloxy, when R is monovalent, and the ripple mark ($) represents a position selected from the group consisting of α-position and β-position.

3. A compound of the formula:

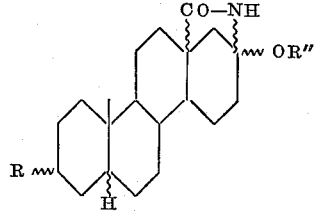

wherein R represents a radical selected from the group consisting of oxo and ethylenedioxy, when R is divalent, hydroxy, acetoxy and benzoyloxy, when R is monovalent, R" represents a radical selected from the group consisting of lower alkyl and lower alkanoyl of from 1 to 4 carbon atoms and the ripple mark (⸗) represents a position selected from the group consisting of α-position and β-position.

4. A compound of the formula:

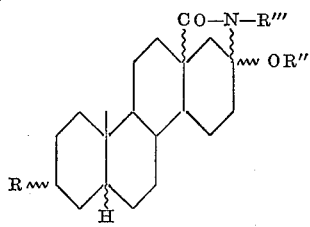

wherein R represents a radical selected from the group consisting of oxo and ethylenedioxy, when R is divalent, and hydroxy, acetoxy and benzoxyloxy, when R is monovalent, R″ represents a radical selected from the group consisting of lower alkyl and lower alkanoyl of from 1 to 4 carbon atoms, R‴ represents a radical selected from the group consisting of lower alkyl-sulfonyl, benzenesulfonyl, lower alkylbenzene-sulfonyl and phenyl(lower)alkylsulfonyl, and the ripple mark (⸗) represents a position selected from the group consisting of α-position and β-position.

5. A compound of the formula:

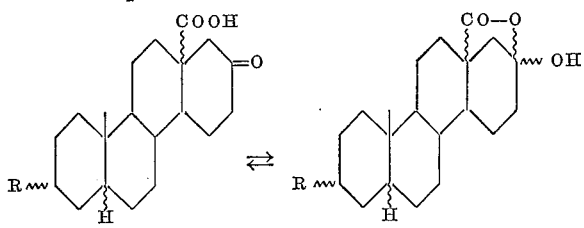

wherein R represents a radical selected from the group consisting of oxo and ethylenedioxy, when R is divalent, and hydroxy, acetoxy and benzoyloxy, when R is monovalent, and the ripple mark (⸗) represents a position selected from the group consisting of α-position and β-position.

6. A compound of the formula:

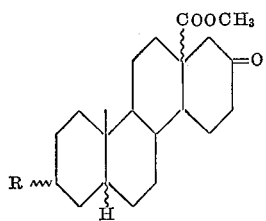

wherein R represents a radical selected from the group consisting of oxo and ethylenedioxy, when R is divalent, and hydroxy, acetoxy and benzoyloxy, when R is monovalent, and the ripple mark (⸗) represents a position selected from the group consisting of α-position and β-position.

7. A compound of the formula:

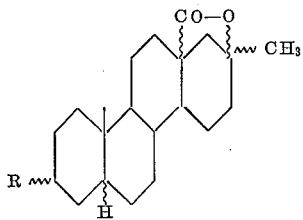

wherein R represents a radical selected from the group consisting of oxo and ethylenedioxy, when R is divalent, and hydroxy, acetoxy and benzoyloxy, when R is monovalent, and the ripple mark (⸗) represents a position selected from the group consisting of α-position and β-position.

8. A compound of the formula:

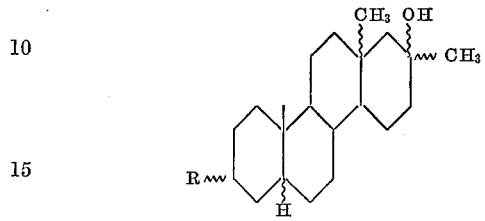

wherein R represents a radical selected from the group consisting of oxo and ethylenedioxy, when R is divalent, and hydroxy, acetoxy and benzoyloxy, when R is monovalent, and the ripple mark (⸗) represents a position selected from the group consisting of α-position and β-position.

9. A compound of the formula:

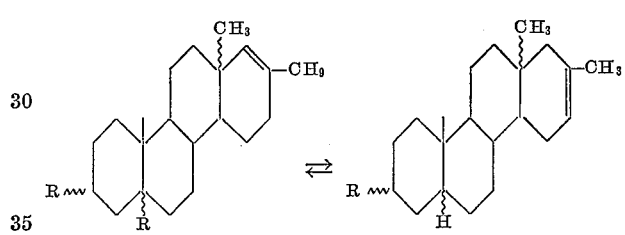

wherein R represents a radical selected from the group consisting of oxo and ethylenedioxy, when R is divalent, and hydroxy, acetoxy and benzoyloxy, when R is monovalent, and the ripple mark (⸗) represents a position selected from the group consisting of α-position and β-position.

10. A compound of the formula:

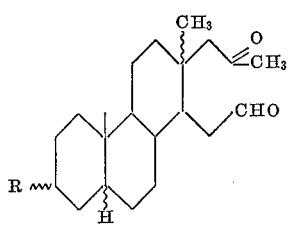

wherein R represents a radical selected from the group consisting of oxo and ethylenedioxy, when R is divalent, and hydroxy, acetoxy and benzoyloxy, when R is monovalent, and the ripple mark (⸗) represents a position selected from the group consisting of α-position and β-position.

References Cited by the Examiner
UNITED STATES PATENTS
3,024,271  3/62  Amiard et al. _____ 260—586

NICHOLAS S. RIZZO, *Primary Examiner*.